US012368991B2

(12) United States Patent
Li et al.

(10) Patent No.: US 12,368,991 B2
(45) **Date of Patent: *Jul. 22, 2025**

(54) SPEAKER DEVICE

(71) Applicant: SHENZHEN SHOKZ CO., LTD., Guangdong (CN)

(72) Inventors: Chaowu Li, Shenzhen (CN); Yongjian Li, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/431,968

(22) Filed: Feb. 3, 2024

(65) Prior Publication Data

US 2024/0179446 A1 May 30, 2024

Related U.S. Application Data

(63) Continuation of application No. 17/305,242, filed on Jul. 1, 2021, now Pat. No. 11,943,577, which is a (Continued)

(30) Foreign Application Priority Data

Jan. 5, 2019 (CN) ......................... 201910009927.4

(51) Int. Cl.
*H04R 1/10* (2006.01)
*H04R 1/02* (2006.01)
(Continued)

(52) U.S. Cl.
CPC ............. *H04R 1/105* (2013.01); *H04R 1/023* (2013.01); *H04R 1/026* (2013.01); *H04R 1/1008* (2013.01);
(Continued)

(58) Field of Classification Search
CPC ........ H04R 1/105; H04R 1/023; H04R 1/026; H04R 1/1008; H04R 1/1041;
(Continued)

(56) References Cited

U.S. PATENT DOCUMENTS 9,532,132 B2 * 12/2016 Nakaishi .............. H04R 31/006
9,866,940 B2 * 1/2018 Walker ................. H04R 1/1016
(Continued)

FOREIGN PATENT DOCUMENTS

CN 204465795 U 7/2015
CN 107454492 A 12/2017
(Continued)

OTHER PUBLICATIONS

International Search Report in PCT/CN2019/102399 mailed on Oct. 30, 2019, 7 pages.
(Continued)

*Primary Examiner* — Disler Paul
(74) *Attorney, Agent, or Firm* — Metis IP LLC

(57) ABSTRACT

The present disclosure relates to a speaker device. The speaker device may include an ear hook, a core housing for accommodating an earphone core, and a circuit housing for accommodating a control circuit or a battery. The ear hook may include a first plug end and a second plug end. The ear hook may be surrounded by a protective sleeve which may be made of an elastic waterproof material. The ear hook may be elastic, and a position of the core housing relative to the ear hook may be changed according to an elastic deformation of the ear hook, thereby the core housing may fit a user in front of or behind an ear of the user. The circuit housing may be fixed to the second plug end. The control circuit or the battery may drive the earphone core to vibrate to generate a sound.

20 Claims, 12 Drawing Sheets

Related U.S. Application Data continuation of application No. PCT/CN2019/102399, filed on Aug. 24, 2019.

(51) Int. Cl.

| | |
|---|---|
| ***H04R 1/44*** | (2006.01) |
| ***H04R 9/02*** | (2006.01) |
| ***H04R 31/00*** | (2006.01) |

(52) U.S. Cl.

CPC ......... *H04R 1/1041* (2013.01); *H04R 1/1058* (2013.01); *H04R 1/1091* (2013.01); *H04R 1/44* (2013.01); *H04R 9/025* (2013.01); *H04R 31/00* (2013.01); *H04R 1/1016* (2013.01); *H04R 1/1025* (2013.01); *H04R 2201/10* (2013.01); *H04R 2460/13* (2013.01)

(58) Field of Classification Search

CPC .. H04R 1/1058; H04R 1/1091; H04R 1/1025; H04R 2201/10

See application file for complete search history.

(56) References Cited

U.S. PATENT DOCUMENTS

| | | | | |
|---|---|---|---|---|
| 9,942,646 | B2 * | 4/2018 | McGarry | H04R 1/1033 |
| 10,003,881 | B2 | 6/2018 | Cousins et al. | |
| 10,104,463 | B2 | 10/2018 | Kim et al. | |
| 10,491,983 | B2 * | 11/2019 | Oh | H04R 1/083 |
| 10,531,174 | B2 * | 1/2020 | Prevoir | C08K 5/06 |
| 2001/0002928 | A1 * | 6/2001 | Cummins | H04B 1/385 379/430 |
| 2015/0365757 | A1 * | 12/2015 | Abreu | G02C 11/06 381/381 |
| 2017/0374446 | A1 | 12/2017 | Adams | |
| 2018/0103858 | A1 * | 4/2018 | Marcus | A61B 5/6803 |
| 2019/0098392 | A1 * | 3/2019 | Abreu | G02C 3/003 |
| 2021/0165243 | A1 * | 6/2021 | Wang | H04R 9/025 |
| 2021/0329376 | A1 | 10/2021 | Li et al. | |

FOREIGN PATENT DOCUMENTS

| | | | |
|---|---|---|---|
| CN | 107484054 | A | 12/2017 |
| CN | 107493532 | A | 12/2017 |
| CN | 207039848 | U | 2/2018 |
| CN | 207039849 | U | 2/2018 |
| CN | 207039850 | U | 2/2018 |
| CN | 207039851 | U | 2/2018 |
| CN | 207070281 | U | 3/2018 |
| CN | 207070282 | U | 3/2018 |
| CN | 207070284 | U | 3/2018 |
| KR | 101673414 | B1 | 11/2016 |

OTHER PUBLICATIONS

Written Opinion in PCT/CN2019/102399 mailed on Oct. 30, 2019, 10 pages.

* cited by examiner

SPEAKER DEVICE

CROSS REFERENCE TO RELATED APPLICATIONS

This application is a Continuation of U.S. patent application Ser. No. 17/305,242, filed on Jul. 1, 2021, which is a Continuation of International Patent Application No. PCT/CN2019/102399, filed on Aug. 24, 2019, which claims priority of Chinese Patent Application No. 201910009927.4, filed on Jan. 5, 2019, and the entire contents of each of which are incorporated herein by reference.

TECHNICAL FIELD

The present disclosure relates to a speaker device, and in particular, to a speaker device with waterproof function.

BACKGROUND

In general, people can hear the sound because the air transmits vibration to the eardrum through the external ear canal, and the vibration formed by the eardrum drives the human auditory nerve, and people can perceive the sound. At present, earphones are widely used in people's lives. For example, users can use earphones to play music, answer calls, etc. Earphones have become an important item in people's daily life. Generally, earphones in the market may not satisfy a user's requirement on some occasions (e.g., when the user is swimming, when the user is outdoor in rainy days). Earphones with waterproof function and good sound quality are more popular. Therefore, it is desirable to provide a speaker device with waterproof function.

SUMMARY

According to an aspect of the present disclosure, a speaker device is provided. The speaker device may include an ear hook, a core housing, and a circuit housing. The ear hook may include a first plug end and a second plug end. The ear hook may be surrounded by a protective sleeve. The protective sleeve may be made of an elastic waterproof material. The core housing may be configured for accommodating an earphone core. The core housing may be fixed to the first plug end and elastically abutted against the protective sleeve. The ear hook may be elastic, and a position of the core housing relative to the ear hook may be changed according to an elastic deformation of the ear hook, thereby the core housing may fit a user in front of or behind an ear of the user. The circuit housing may be configured for accommodating a control circuit or a battery. The circuit housing may be fixed to the second plug end. The control circuit or the battery may drive the earphone core to vibrate to generate a sound.

In some embodiments, the ear hook may include an elastic metal wire, a wire, and a fixed sleeve. The fixed sleeve may fix the wire on the elastic metal wire. The protective sleeve may be formed, by injection molding, on periphery of the elastic metal wire, the wire, the fixed sleeve, the first plug end, and the second plug end.

In some embodiments, the first plug end and the second plug end may be formed, by injection molding, at both ends of the elastic metal wire respectively. The first plug end and the second plug end may be arranged with a first wiring channel and a second wiring channel respectively. The wire may extend along the first wiring channel and the second wiring channel.

In some embodiments, the wire may pass through the first wiring channel and the second wiring channel.

In some embodiments, the first wiring channel may include a first wiring groove and a first wiring hole connecting the first wiring groove and an outer end surface of the first plug end. The wire may extend along the first wiring groove and the first wiring hole and be exposed on the outer end surface of the first plug end. The second wiring channel may include a second wiring groove and a second wiring hole connecting the second wiring groove and the outer end surface of the first plug end. The wire may extend along the second wiring groove and the second wiring hole and may be exposed on the outer end surface of the second plug end.

In some embodiments, the ear hook may include at least two fixed sleeves spaced apart along the elastic metal wire.

In some embodiments, the core housing may be arranged with a first socket connecting with an outer end surface of the core housing. A stopping block may be arranged on an inner sidewall of the first socket. The first socket may be connected to the first plug end.

In some embodiments, the first plug end may include an inserting portion and two elastic hooks.

The inserting portion may be at least partially inserted into the first socket and abutting against an outer side surface of the stopping block. The two elastic hooks may be arranged on a side of the inserting portion facing inside of the core housing. The two elastic hooks may be brought together under action of external thrust and the stopping block. After passing through the stopping block, the two elastic hooks may be elastically restored to be stuck on an inner surface of the stopping block to realize the fixation of the core housing and the first plug end.

In some embodiments, the inserting portion may be partially inserted into the first socket. An exposed part of the inserting portion may be arranged in a stepped manner to form an annular table surface spaced apart from the outer end surface of the core housing.

In some embodiments, the protective sleeve may further extend to a side of the annular table surface facing the outer end surface of the core housing. When the core housing and the first plug end are fixed, the protective sleeve may elastically abut against the core housing to realize sealing.

In some embodiments, the speaker device may further include a fastener. The circuit housing may be arranged with a second socket. The second plug end may be at least partially inserted into the second socket and connected to the second socket by the fastener.

In some embodiments, the second plug end may be arranged with a slot perpendicular to an inserting direction of the second socket. A through hole corresponding to a position of the slot may be arranged on a first sidewall of the circuit housing. The fastener may include two parallel pins and a connecting portion for connecting the pins. The pins may be inserted into the slot from outside of the circuit housing through the through hole to realize the plug and fixation of the circuit housing and the second plug end.

In some embodiments, the ear hook may further include a housing sheath integrally formed with the protective sleeve. The housing sheath may be wrapped around periphery of the circuit housing.

In some embodiments, the speaker device may further include an auxiliary function module and a flexible circuit board. The auxiliary function module may be configured to receive an auxiliary signal and perform an auxiliary function. The flexible circuit board may be configured to electrically connect to an audio signal wire and an auxiliary signal wire of the control circuit, and electrically connect the audio signal wire and the auxiliary signal wire to the earphone core and the auxiliary function module respectively. The auxiliary function module and the flexible circuit board may be accommodated in the core housing.

In some embodiments, the flexible circuit board may at least include a plurality of first pads and a plurality of second pads. At least one first pad of the plurality of first pads may be electrically connected to the audio signal wire. The at least one first pad may be electrically connected to at least one second pad of the plurality of second pads via a first flexible lead on the flexible circuit board. The at least one second pad may be electrically connected to the earphone core through an external wire. At least another first pad of the plurality of first pads may be electrically connected to the auxiliary signal wire. The at least another first pad may be electrically connected to the auxiliary function module via a second flexible lead on the flexible circuit board.

In some embodiments, the flexible circuit board may include a main circuit board and a first branch circuit board. The first branch circuit board may be connected to the main circuit board and extend away from the main circuit board along one end of the main circuit board. The auxiliary function module may at least include a first auxiliary function module and a second auxiliary function module. The first auxiliary function module may be disposed on the main circuit board. The second auxiliary function module may be disposed on the first branch circuit board.

In some embodiments, the plurality of first pads may be disposed on the main circuit board. The at least one second pad may be disposed on the first branch circuit board.

In some embodiments, the flexible circuit board may further include a second branch circuit board spaced from the first branch circuit board. The second branch circuit board may be connected to the main circuit board and extend away from the main circuit board along the other end of the main circuit board. The auxiliary function module may further include a third auxiliary function module. The third auxiliary function module may be disposed on the second branch circuit board.

In some embodiments, the plurality of first pads may be disposed on the main circuit board. The at least one second pad may be disposed on the first branch circuit board. The other second pads of the plurality of second pads may be disposed on the second branch circuit.

In some embodiments, the earphone core may include a magnetic circuit assembly and a vibration assembly. The magnetic circuit assembly may be configured to provide a magnetic field. The vibration assembly may include a coil and an internal lead. The coil may be located in the magnetic field. The internal lead may be electrically connected to the coil. The coil may receive an audio current through the internal lead and convert the audio current into a mechanical vibration signal in the magnetic field. One end of an external wire may be electrically connected to the second pad, and the other end of the external wire may be electrically connected to the internal lead to transmit the audio current to the coil.

In some embodiments, the core housing may include a wiring groove. At least one of the external wire and the internal lead may be partially disposed in the wiring groove.

In some embodiments, the internal lead and the external wire may be welded to each other. A welding position may be located in the wiring groove.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
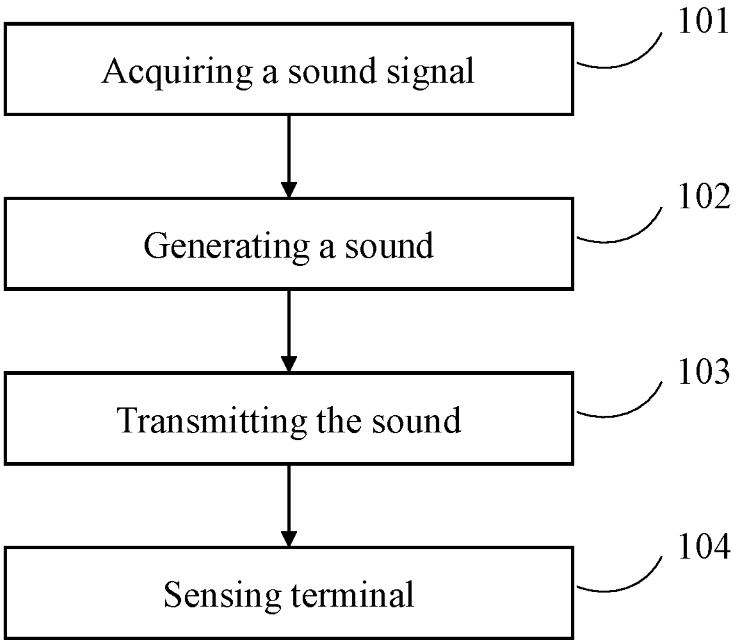
FIG. 1 is a flowchart illustrating an exemplary process for generating auditory sense through a speaker device according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment", and the term "another embodiment" means "at least one additional embodiment". Related definitions of other terms will be given in the description below. Hereinafter, "player", "speaker device", "speaking device" or "speaker" will be used in describing the sound conduction related techniques in the present invention. This description is only a form of speaker application. For those skilled in the art, "speaker device", "speaker", or "earphone" can also be replaced by other similar words, such as "player", "hearing aid", or the like. In fact, the various implementations in the present disclosure may be easily applied to other non-speaker-type hearing devices. For example, for those skilled in the art, after understanding the basic principle of the speaker device, various modifications and changes to the implementation of the speaker device may be performed on the specific methods and details of the speaker device without departing from this principle. In particular, the environment sound picking and processing function may be added to the speaker device, so that the speaker device has the function of the hearing aid. For example, in the case of using a bone conduction speaker device, a sound transmitter such as a microphone may pick up an ambient sound close to the user/wearer. The sound may be further processed using a certain algorithm, and the processed sound (or a generated electrical signal) may be transmitted to the user/wearer. That is, the speaker device may be modified and have the function of picking up ambient sound. The ambient sound may be processed and transmitted to the user/wearer through the speaker device, thereby implementing the function of a hearing aid. The algorithm mentioned above may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

FIG. 1 is a flowchart illustrating an exemplary process for generating auditory sense through a speaker device according to some embodiments of the present disclosure. The speaker device may transfer sound to an auditory system through bone conduction or air conduction, thereby generating auditory sense. As shown in FIG. 1, the process for generating the auditory sense through the speaker device may include the following operations.

In 101, the speaker device may acquire or generate a signal (also referred to as a "sound signal") containing sound information. In some embodiments, the sound information may refer to a video file or an audio file with a specific data format, or data or files that may be converted to a sound through specific approaches. In some embodiments, the signal containing the sound information may be obtained from a storage unit of the speaker device itself. In some embodiments, the signal containing the sound information may be obtained from an information generation system, a storage system, or a transmission system other than the speaker device. The signal containing the sound information may include an electrical signal, and/or other forms of signals other than the electrical signal, such as an optical signal, a magnetic signal, and a mechanical signal, or the like. In principle, as long as the signal includes information that may be used to generate sounds by a speaker device, the signal may be processed as the sound signal. In some embodiments, the sound signal may come from a signal source, or a plurality of signal sources. The plurality of signal sources may be independent of or dependent on each other. In some embodiments, manners of generating or transmitting the sound signal may be wired or wireless and may be real-time or time-delayed. For example, the speaker device may receive an electrical signal containing sound information via a wired or wireless connection or may obtain data directly from a storage medium and generate a sound signal. Taking bone conduction technology as an example, components with sound collection function(s) may be added to a bone conduction speaker device. The bone conduction speaker device may pick up sound from the ambient environment and convert mechanical vibration of the sound into an electrical signal. Further, the electrical signal may be processed through an amplifier to meet specific requirements. The wired connection may be realized by using, including but not limited to a metal cable, an optical cable, or a hybrid cable of metal and optical, such as a coaxial cable, a communication cable, a flexible cable, a spiral cable, a non-metal sheathed cable, a metal sheathed cable, a multi-core cable, a twisted pair cable, a ribbon cable, a shielded cable, a telecommunication cable, a double-stranded cable, a parallel twin-core wire, a twisted-pair wire. The wired connection may also be realized by using other types of transmission carriers, such as transmission carriers for electrical or optical signal.

The storage device or storage unit mentioned herein may include a storage device or storage unit on a direct attached storage, a network attached storage, a storage area network, and/or other storage systems. The storage device may include but is not limited to common types of storage devices such as a solid-state storage device (a solid-state drive, a solid-state hybrid hard drive, etc.), a mechanical hard drive, a USB flash drive, a memory stick, a storage card (e.g., CF, SD, etc.), and other drives (e.g., CD, DVD, HD DVD, Blu-ray, etc.), a random access memory (RAM), a read-only memory (ROM), etc. The RAM may include but is not limited to a decimal counter, a selection tube, a delay line memory, a Williams tube, a dynamic random access memory (DRAM), a static random access memory (SRAM), a thyristor random access memory (T-RAM), a zero capacitive random access memory (Z-RAM), etc. The ROM may include but is not limited to a magnetic bubble memory, a magnetic button line memory, a thin film memory, a magnetic plating line memory, a magnetic core memory, a drum memory, an optical disk driver, a hard disk, a magnetic tape, an early non-volatile memory (NVRAM), a phase change memory, a magneto-resistive random access memory, a ferroelectric random access memory, a non-volatile SRAM, a flash memory, an electronically erasable rewritable read-only memory, an erasable programmable read-only memory, a programmable read-only memory, a shielded heap read memory, a floating connection gate random access memory, a nano random access memory, a racetrack memory, a variable resistance memory, a programmable metallization unit, etc. The storage device/storage unit mentioned above is only used for illustration purposes. The storage medium used in the storage device/unit is not limited.

In 102, the speaker device may convert the signal containing the sound information into a vibration to generate the sound. The speaker device may use a specific transducer to convert the signal into a mechanical vibration, and the generation of the mechanical vibration may accompany with energy conversion. The energy conversion process may include coexistence and conversion of multiple types of energy. For example, the electrical signal may be directly converted into the mechanical vibration by the transducers, and generate the sound. As another example, the sound information may be included in an optical signal, which may be converted into mechanical vibrations by a specific transducer. Other types of energy that may be coexisting and converted when the transducer works may include thermal energy, magnetic field energy, etc. In some embodiments, an energy conversion type of the transducer may include but is not limited to, a moving coil type, an electrostatic type, a piezoelectric type, a moving iron type, a pneumatic type, an electromagnetic type, or the like, or any combination thereof. A frequency response range and sound quality of the speaker device may be affected by the energy conversion type and a property of each physical component of the transducer. For example, in a transducer with the moving coil type, a wound cylindrical coil may be connected to a vibration plate, the coil driven by a signal current may drive the vibration plate to vibrate in a magnetic field and generate the sound. Factors, such as material expansion and contraction, folds deformation, a size, a shape, and a fixation manner of the vibration plate, a magnetic density of a permanent magnet, etc., may have a relatively great effect on the sound quality of the speaker device.

The term "sound quality" used herein may indicate the quality of the sound, which may refer to an audio fidelity after the sound is processed, transmitted, or the like. In an audio device, the sound quality may include audio intensity and magnitude, an audio frequency, an audio overtone, or harmonic components, etc. For an audio device, the sound quality may include audio intensity and magnitude, an audio frequency, an audio overtone, a harmonic component, or the like, or any combination thereof. When the sound quality is evaluated, a measuring manner and an evaluation criterion for objectively evaluating the sound quality may be used, other manners that combine different elements of the sound and subjective feelings for evaluating various properties of the sound quality may also be used.

In 103, the sound is transmitted by a transmission system. In some embodiments, a transmission system refers to a substance that can deliver a vibration signal containing sound information, such as the skull, the bony labyrinth, the inner ear lymph, the spiral organ of a human or/and an animal with the auditory system. As another example, the transmission system also refers to a medium (e.g., air and liquid) that may transmit a sound. To illustrate the process of transmitting sound information by the transmission system, a bone conduction speaker device may be taken as an example. The bone conduction speaker device may directly transmit a sound wave (e.g., a vibration signal) converted from an electrical signal to an auditory center through bones. In addition, the sound wave may be transmitted to the auditory center through air conduction. More descriptions regarding the air conduction may be found elsewhere in the present disclosure.

In 104, the sound information may be transmitted to a sensing terminal. Specifically, the sound information may be transmitted to the sensing terminal through the transmission system. In some embodiments, the speaker device may pick up or generate a signal containing the sound information, convert the sound information into a sound vibration by the transducer. The speaker device may transmit the sound to the sensing terminal through the transmission system, and a user may hear the sound. Generally, a subject of the sensing terminal, the auditory system, the sensory organ, etc., described above may be a human or an animal with the auditory system. It should be noted that the following description of the speaker device used by a human does not constitute a restriction on the application scene of the speaker device, and similar descriptions may also be applied to other animals.

It should be noted that the above descriptions of the implementing process of the speaker device are merely provided for the purposes of illustration, and not intended to limit the scope of the present disclosure. For persons having ordinary skills in the art, multiple variations and modifications in forms and details of the specific methods and operations of implementing the speaker device may be made under the teachings of the present disclosure. However, those variations and modifications do not depart from the scope of the present disclosure. For example, a signal correcting or enhancing operation may be added between acquiring the signal containing sound information in operation 101 and generating the sound in operation 102, which may enhance or correct the signal acquired in 101 according to a specific algorithm or parameter. As another example, a vibration enhancing or correcting operation may be additionally added between generating the sound in operation 102 and transmitting the sound in operation 103.

Figure 2:
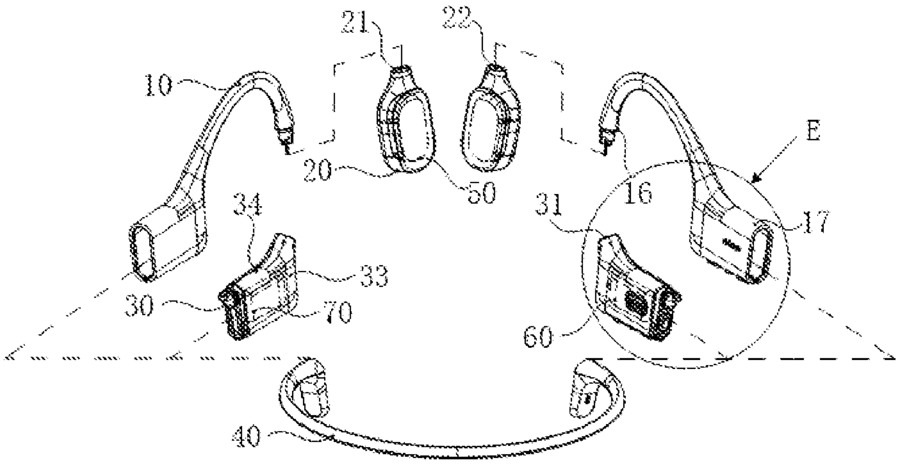
FIG. 2 is a schematic diagram illustrating an exploded structure of an exemplary MP3 player according to some embodiments of the present disclosure.
Figure 3:
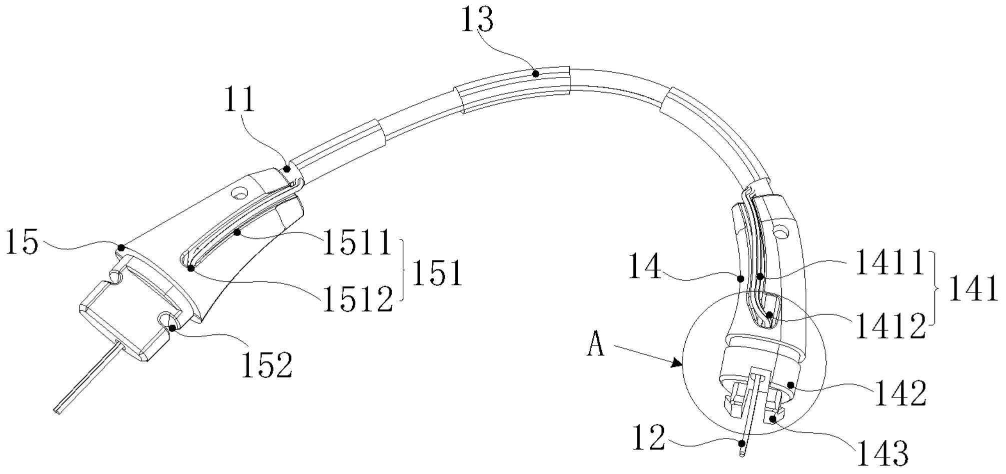
FIG. 3 is a schematic diagram illustrating a part of a structure of an exemplary ear hook of an MP3 player according to some embodiments of the present disclosure.
Figure 4:
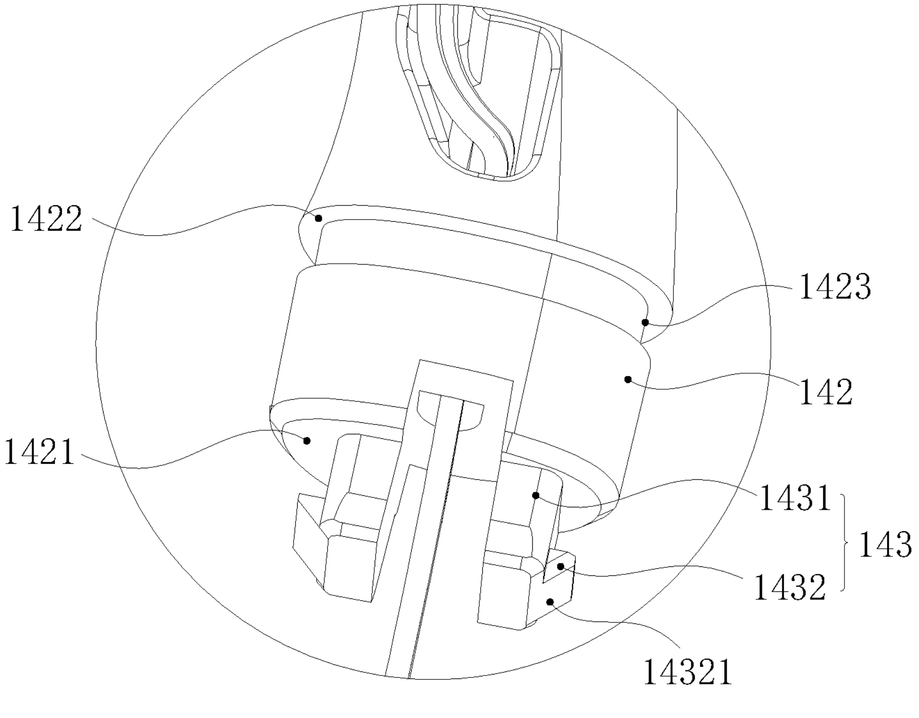
FIG. 4 is a schematic diagram illustrating a partially enlarged view of part A in FIG. 3 according to some embodiments of the present disclosure.

The speaker device described according to some embodiments of the present disclosure may include, but is not limited to, an earphone, an MP3 player, or a hearing aid. In the following specific embodiments of the present disclosure, an MP3 player is taken as an example to describe the speaker device in detail. FIG. 2 is a schematic diagram illustrating an exploded structure of an exemplary MP3 player according to some embodiments of the present disclosure. FIG. 3 is a schematic diagram illustrating a part of a structure of an exemplary ear hook of an MP3 player according to some embodiments of the present disclosure. FIG. 4 is a schematic diagram illustrating a partially enlarged view of part A in FIG. 3 according to some embodiments of the present disclosure. As shown in FIG. 2, in some embodiments, an MP3 player may include an ear hook 10, a core housing 20, a circuit housing 30, a rear hook 40, an earphone core 50, a control circuit 60, and a battery 70. The core housing 20 and the circuit housing 30 may be disposed at two ends of the ear hook 10 respectively, and the rear hook 40 may be further disposed at an end of the circuit housing 30 away from the ear hook 10. A count of the core housings 20 may be two. The two core housings 20 may be configured to accommodate two earphone cores 50, respectively. A count of the circuit housings 30 may be two. The two circuit housings 30 may be configured to accommodate the control circuit 60 and the battery 70, respectively. Two ends of the rear hook 40 may be connected to the corresponding circuit housings 30 respectively. The ear hook 10 refers to a structure surrounding and supporting a user's ear when the user wears a bone conductive MP3 player, and then suspending and fixing the core housing 20 and the earphone core 50 at a predetermined position of the user's ear.

Referring to FIGS. 2-4, in some embodiments, the ear hook 10 may include an elastic metal wire 11, a wire 12, a fixed sleeve 13, a first plug end 14, and a second plug end 15. The first plug end 14 and the second plug end 15 may be disposed at both ends of the elastic metal wire 11. In some embodiments, the ear hook 10 may further include a protective sleeve 16 and a housing sheath 17 integrally formed with the protective sleeve 16. The elastic metal wire 11 may be mainly used to keep the ear hook 10 in a shape that matches the user's ear. The elastic metal wire 11 may have a certain elasticity, so as to generate a certain elastic deformation according to the user's ear shape and head shape to adapt to users with different ear shapes and head shapes. In some embodiments, the elastic metal wire 11 may be made of a memory alloy, which has good deformation recovery ability. Thus, even if the ear hook 10 is deformed by an external force, it may still be restored to its original shape when the external force is removed, and continue to be used by users, thereby extending the life of the MP3 player. In other embodiments, the elastic metal wire 11 may also be made of a non-memory alloy. The wire 12 may be used for electrical connection with the earphone core 50, the control circuit 60, the battery 70, etc., for power supply and data transmission for the operation of the earphone core 50.

The fixed sleeve 13 may be used to fix the wire 12 on the elastic metal wire 11. In this embodiment, there are at least two fixed sleeves 13. The at least two fixed sleeves 13 may be spaced apart along the elastic metal wire 11 and the wire 12, and disposed on the outer periphery of the wire 12 and the elastic metal wire 11 by wrapping to fix the wire 12 on the elastic metal wire 11.

In some embodiments, the first plug end 14 and the second plug end 15 may be made of hard materials, such as plastic. In some embodiments, the first plug end 14 and the second plug end 15 may be formed respectively on both ends of the elastic metal wire 11 by injection molding. In some embodiments, the first plug end 14 and the second plug end 15 may be formed by injection molding separately. Connection holes to connect with the end of the elastic metal wire 11 are respectively reserved during the injection molding of the first plug end 14 and the second plug end 15. After the injection molding is completed, the first plug end 14 and the second plug end 15 may be inserted into the corresponding ends of the elastic metal wire 11 respectively by the connection holes or fixed by bonding.

It should be noted that, in this embodiment, the first plug end 14 and the second plug end 15 may not be directly formed by injection molding on the periphery of the wire 12, which avoids the wire 12 during injection molding. Specifically, when the first plug end 14 and the second plug end 15 are injection molded, the wire 12 located at both ends of the elastic metal wire 11 may be fixed to be far away from the position of the first plug end 14 and the second plug end 15. Further, a first wiring channel 141 and a second wiring channel 151 may be disposed respectively on the plug 14 and the second plug end 15 to extend the wire 12 along the first wiring channel 141 and the second wiring channel 151 after the injection molding. Specifically, the wire 12 may be threaded into the first wiring channel 141 and the second wiring channel 151 in a threading way after the first wiring channel 141 and the second wiring channel 151 are formed. In some embodiments, the first plug end 14 and the second plug end 15 may be directly injection molded on the periphery of the wire 12 according to actual conditions, which is not specifically limited herein.

In some embodiments, the first wiring channel 141 may include a first wiring groove 1411 and a first wiring hole 1412 connecting with the first wiring groove 1411. The first wiring groove 1411 may be connected with the sidewall of the first plug end 14. One end of the first wiring hole 1412 may be connected with one end of the first wiring groove 1411 and another end of the first wiring hole 1412 may be connected with the outer end surface of the first plug end 14. The wire 12 at the first plug end 14 may extend along the first wiring groove 1411 and the first wiring hole 1412 and be exposed on the outer end surface of the first plug end 14 to further connect with other structures.

In some embodiments, the second wiring channel 151 may include a second wiring groove 1511 and a second wiring hole 1512 connecting with the second wiring groove 1511. The second wiring groove 1511 may be connected with the sidewall of the second plug end 15, one end of the second wiring hole 1512 may be connected with one end of the second wiring groove 1511, and another end of the second wiring hole 1512 may be connected with the outer end surface of the second plug end 15. The wire 12 at the second plug end 15 may extend along the second wiring groove 1511 and the second wiring hole 1512 and be exposed on the outer end surface of the second plug end 15 to further connect to other structures.

In some embodiments, the outer end surface of the first plug end 14 refers to the surface of the end of the first plug end 14 away from the second plug end 15. The outer end surface of the second plug end 15 refers to the surface of the end of the second plug end 15 away from the first plug end 14.

In some embodiments, the protective sleeve 16 may be injection molded around periphery of the elastic metal wire 11, the wire 12, the fixed sleeve 13, the first plug end 14, and the second plug end 15. Thus, the protective sleeve 16 may be fixedly connected with the elastic metal wire 11, the wire 12, the fixed sleeve 13, the first plug end 14, and the second plug end 15 respectively. There is no need to form the protective sleeve 16 separately by injection molding and then further wrap protective sleeve 16 around the periphery of the elastic metal wire 11, the first plug end 14, and the second plug end 15. It may simplify the manufacturing and assembly processes and make the fixation of the protective sleeve 16 more reliable and stable.

In some embodiments, when the protective sleeve 16 is formed, a housing sheath 17 disposed on the side close to the second plug end 15 may be integrally formed with the protective sleeve 16. In some embodiments, the housing sheath 17 may be integrally formed with the protective sleeve 16 to form a whole structure. The circuit housing 30 may be connected to one end of the ear hook 10 by being fixedly connected to the second plug end 15. The housing sheath 17 may be further wrapped around the periphery of the circuit housing 30 in a sleeved manner.

Specifically, when manufacturing the ear hook 10 of the MP3 player, the following operation may be implemented.

In operation S101, the fixed sleeve 13 may be used to fix the wire 12 on the elastic metal wire 11. An injection position is reserved at both ends of the elastic metal wire 11. Specifically, the elastic metal wire 11 and the wire 12 may be placed side by side in a preset way, and then the fixed sleeve 13 is further sleeved around the wire 12 and the elastic metal wire 11, so as to fix the wire 12 on the elastic metal wire 11. Since the two ends of the elastic metal wire 11 still need the injection molded first plug end 14 and the second plug end 15, the two ends of the elastic metal wire 11 may not be completely wrapped by the fixed sleeve 13. A corresponding injection position needs to be reserved for injection molding of the first plug end 14 and the second plug end 15.

In operation S102, the first plug end 14 and the second plug end 15 may be injection molded at the injection positions of the two ends of the elastic metal wire 11, respectively. The first wiring channel 141 and the second wiring channel 151 are disposed on the first plug end 14 and the second plug end 15, respectively.

In operation S103, the wire 12 may be disposed to extend along the first wiring channel 141 and the second wiring channel 151. Specifically, after the forming of the first plug end 14 and the second plug end 15 is completed, the two ends of the wire 12 may be further threaded into the first wiring channel 141 and the second wiring channel 151 manually or by a machine. The part of the wire 12 located between the first wiring channel 141 and the second wiring channel 151 may be fixed on the elastic metal wire 11 by the fixed sleeve 13.

In operation S104, the protective sleeve 16 may be formed by injection molding on the periphery of the elastic metal wire 11, the wire 12, the fixed sleeve 13, the first plug end 14, and the second plug end 15.

In some embodiments, when operation S104 is performed, the housing sheath 17 may be integrally formed with the protective sleeve 16 on the periphery of the second plug end 15 by injection molding.

In some embodiments, it should be noted that the wire 12 may not be disposed when the fixed sleeve 13 is installed. The wire 12 may be further disposed after the first plug end 14 and the second plug end 15 are injection molded. The specific operations are as follows.

In operation S201, the fixed sleeve 13 may be sleeved on the elastic metal wire 11. The injection molding positions may be reserved at both ends of the elastic metal wire 11.

In operation S202, the first plug end 14 and the second plug end 15 may be injection molded at the injection positions of the two ends of the elastic metal wire 11, respectively. The first wiring channel 141 and the second wiring channel 151 may be disposed on the first plug end 14 and the second plug end 15, respectively.

In operation S203, the wire 12 may be threaded inside the fixed sleeve 13, so as to use the fixed sleeve 13 to fix the wire 12 on the elastic metal wire 11. Further, the wire 12 may be disposed to extend along the first wiring channel 141 and the second wiring channel 151.

It should be noted that, in this way, interference of the wire 12 may be avoided during injection molding of the first plug end 14 and the second plug end 15, so as to facilitate the smooth progress of molding.

It should be noted that the structure, function, and formation of the elastic metal wire 11, the wire 12, the fixed sleeve 13, the first plug end 14, the second plug end 15, and the protective sleeve 16 involved in the embodiment set forth above are the same as those in the foregoing embodiment, and for related details, please refer to the foregoing embodiment, which are not repeated herein.

In some embodiments, the core housing 20 may be used to accommodate the earphone core 50 and may be plugged and fixed with the first plug end 14. A count of the earphone core 50 and the core housing 20 may both be two, corresponding to the left ear and the right ear of the user, respectively.

In some embodiments, the core housing 20 and the first plug end 14 may be connected by plugging, clamping, etc., so as to fix the core housing 20 and the ear hook 10 together. That is, in this embodiment, the ear hook 10 and the core housing 20 may be formed separately first, and then be assembled together, instead of directly forming the two together.

In this way, the ear hook 10 and the core housing 20 may be molded separately with corresponding molds instead of using the same larger-sized mold to form the two integrally, which may reduce the size of the mold and the difficulty of mold process. In addition, since the ear hook 10 and the core housing 20 are processed by different molds, when the shape or structure of the ear hook 10 or the core housing 20 needs to be adjusted in the manufacturing process, it is sufficient to adjust the mold corresponding to the structure instead of adjusting the mold of another structure, so as to reduce the cost of production. In other embodiments, the ear hook 10 and the core housing 20 may be integrally formed according to the situation.

In some embodiments, the core housing 20 may be disposed with a first socket 22 connecting with the outer end surface 21 of the core housing 20. The outer end surface 21 of the core housing 20 refers to the end surface of the core housing 20 facing the ear hook 10. The first socket 22 may include an accommodating space for the first plug end 14 of the ear hook 10 to be inserted into the core housing 20, so as to further realize the plug and fixation between the first plug end 14 and the core housing 20.

Figure 5:
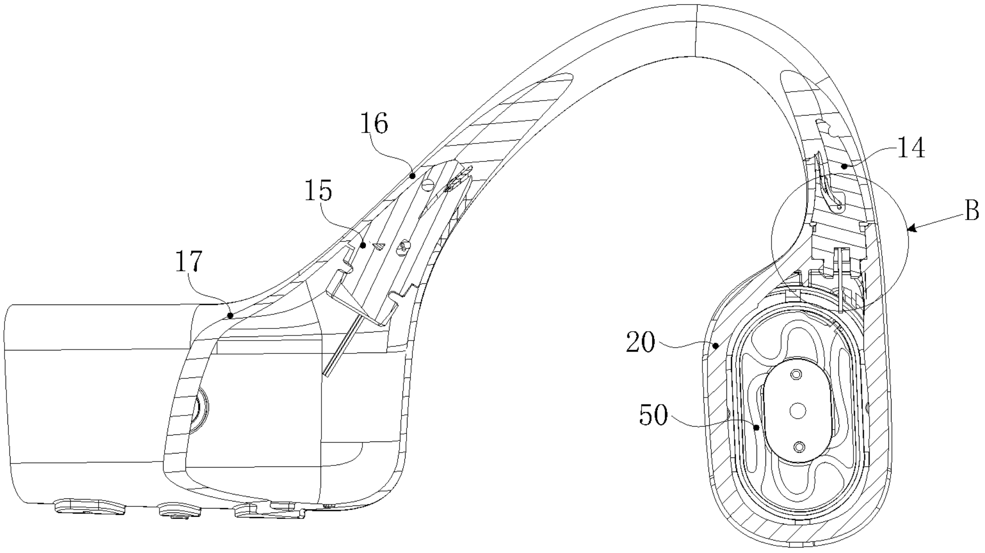
FIG. 5 is a schematic diagram illustrating a partial sectional view of an exemplary MP3 player according to some embodiments of the present disclosure.
Figure 6:
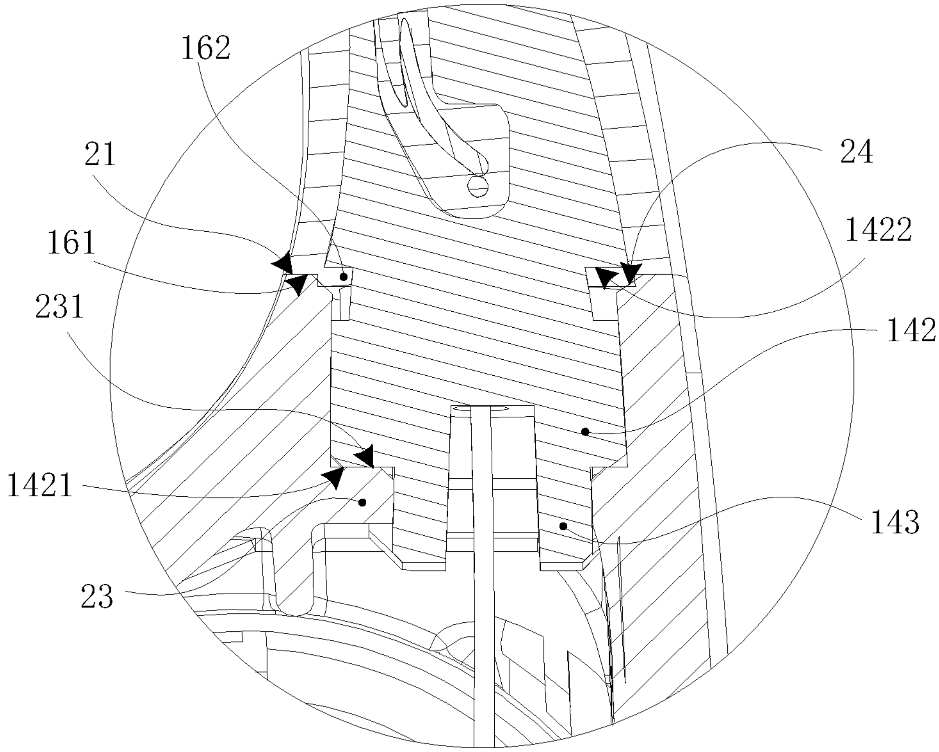
FIG. 6 is a schematic diagram illustrating a partially enlarged view of part B in FIG. 5 according to some embodiments of the present disclosure.

FIG. 5 is a schematic diagram illustrating a partial sectional view of an exemplary MP3 player according to some embodiments of the present disclosure. FIG. 6 is a schematic diagram illustrating a partially enlarged view of part B in FIG. 5.

Referring to FIG. 2, FIG. 5, and FIG. 6, in some embodiments, the first plug end 14 may include an inserting portion 142 and two elastic hooks 143. Specifically, the inserting portion 142 may be at least partially inserted into the first socket 22 and abut against an outer side surface 231 of a stopping block 23. A shape of an outer sidewall of the inserting portion 142 may match that of an inner sidewall of the first socket 22, so that the outer sidewall of the inserting portion 142 may abut against the inner sidewall of the first socket 22 when the inserting portion 142 is at least partially inserted into the first socket 22.

The outer side surface 231 of the stopping block 23 refers to a side of the stopping block 23 facing the ear hook 10. The inserting portion 142 may further include an end surface 1421 facing the core housing 20. The end surface 1421 may match the outer side surface 231 of the stopping block 23, so that the end surface 1421 of the inserting portion 142 may abut against the outer side surface 231 of the stopping block 23 when the inserting portion 142 is at least partially inserted into the first socket 22.

In some embodiments, the two elastic hooks 143 may be disposed on a side of the insertion unit facing an inside of the core housing. For example, the two elastic hooks 143 may be disposed side by side and spaced apart symmetrically on the side of the inserting portion 142 facing an inside of the core housing 20 along a direction of insertion. Each elastic hook 143 may include a beam portion 1431 and a hook portion 1432. The beam portion 1431 may be connected to a side of the inserting portion 142 facing the core housing 20. The hook portion 1432 may be disposed on the beam portion 1431 away from the inserting portion 142 and extend perpendicular to the inserted direction. Further, each hook portion 1432 may include a side parallel to the inserted direction and a transitional slope 14321 away from the end surface 1421 of the inserting portion 142.

In some embodiments, after the core housing 20 and the first plug end 14 are plugged and fixed, at least a portion of the inserting portion 142 may be inserted into the first socket 22. The other portion (i.e., the exposed portion) of the inserting portion 142 outside of the first socket may have a stepped structure, so as to form an annular table 1422 disposed apart from the outer end surface 21 of the core housing 20. The exposed portion of the inserting portion 142 refers to the portion of the inserting portion 142 exposed to the core housing 20. The exposed portion of the inserting portion 142 refers to the portion exposed to the core housing 20 and close to the outer end surface of the core housing 20.

In some embodiments, the annular table 1422 may be disposed opposite to the outer end surface 21 of the core housing 20. A space between the annular table 1422 and the outer end surface 21 refers to a space along the direction of insertion and a space perpendicular to the direction of insertion.

In some embodiments, the protective sleeve 16 may extend to the side of the annular table 1422 facing the outer end surface 21 of the core housing 20. When the first socket 22 and the first plug end 14 of the core housing 20 are in a plugged-in connection, the protective sleeve 16 may be at least partially filled in the space between the annular table 1422 and the outer end surface 21 of the core housing 20, and elastically abut against the core housing 20. Thus, it is difficult for external liquid to enter the inside of the core housing 20 from a junction between the first plug end 14 and the core housing 20, thereby realizing the sealing between the first plug end 14 and the first socket 22, protecting the earphone core 50, etc., inside the core housing 20, and improving the waterproof effect of the MP3 player.

In some embodiments, the protective sleeve 16 may include an annular abutting surface 161 on the outer end surface 21 of the annular table 1422 facing the outer end surface of the core housing 20. The annular abutting surface 161 may be the end surface of the protective sleeve 16 facing the core housing 20.

In some embodiments, the annular table 1422 may be disposed opposite to the outer end surface 21 of the core housing 20. A space between the annular table 1422 and the outer end surface 21 refers to a space along the direction of insertion and a space perpendicular to the direction of insertion.

In some embodiments, the protective sleeve 16 may extend to the side of the annular table 1422 facing the outer end surface 21 of the core housing 20. When the first socket 22 and the first plug end 14 of the core housing 20 are in a plugged-in connection, the protective sleeve 16 may be at least partially filled in the space between the annular table 1422 and the outer end surface 21 of the core housing 20, and elastically abut against the core housing 20. Thus, it is difficult for external liquid to enter the inside of the core housing 20 from a junction between the first plug end 14 and the core housing 20, thereby realizing the sealing between the first plug end 14 and the first socket 22, protecting the earphone core 50, etc., inside the core housing 20, and improving the waterproof effect of the MP3 player.

Specifically, in some embodiments, the protective sleeve 16 may form an annular abutting surface 161 on the outer end surface 21 of the annular table 1422 facing the outer end surface of the core housing 20. The annular abutting surface 161 may be an end surface of the protective sleeve 16 facing the core housing 20.

In some embodiments, the protective sleeve 16 may further include an annular convex table 162 locating inside the annular abutting surface 161 and protruding from the annular abutting surface 161. Specifically, the annular convex table 162 may be formed inside of the annular abutting surface 161 facing the first plug end 14, and may protrude toward the core housing 20 toward the annular abutting surface 161. Further, the annular convex table 162 may be directly formed on the periphery of the annular table 1422 and cover the annular table 1422.

In some embodiments, the core housing 20 may include a connecting slope 24 configured to connect the outer end surface 21 of the core housing 20 and the inner side wall of the first socket 22. The connecting slope 24 may be a transitional surface between the outer end surface 21 of the core housing 20 and the inner side wall of the first socket 22. The connecting slope 24 may not be on a same plane as the outer end surface 21 of the core housing 20 and the inner side wall of the first socket 22. In some embodiments, the connecting slope 24 may be a flat surface, a curved surface, or other shapes according to actual requirements, which is not limited herein.

In some embodiments, when the first plug end 14 is fixedly plugged in the core housing 20, the annular abutting surface 161 and the annular convex table 162 may elastically abut against the outer end surface of the core housing 20 and the connecting slope 24, respectively. It should be noted that since the outer end surface 21 of the core housing 20 and the connecting slope 24 are not on the same plane, the elastic abutment between the protective sleeve 16 and the core housing 20 may be not on the same plane. Thus, it is difficult for external liquid to enter the core housing 20 from the junction of the protective sleeve 16 and the core housing 20, and further enter the earphone core 50 thereby improving the waterproof effect of the MP3 player, protecting the inner structure of the MP3 player, and extending the service life of the MP3 player.

In some embodiments, the inserting portion 142 may include an annular groove 1423 on the side of the annular table 1422 facing the outer end surface 21 of the core housing 2, and the annular groove 1423 may be adjacent to the annular table 1422. The annular convex table 162 may be formed in the annular groove 1423.

In some embodiments, an end of the wire 12 of the ear hook 10 disposed outside the core housing 20 may pass through the second wiring channel 151 to connect the circuits outside the core housing 20, such as the control circuit 60, the battery 70, etc., included in the circuit housing 30. Another end of the wire 12 may be exposed to the outer end surface of the first plug end 14 along the first wiring channel 141, and further enter the core housing 20 through a first socket 22 along with an inserting portion 142.

Figure 7:
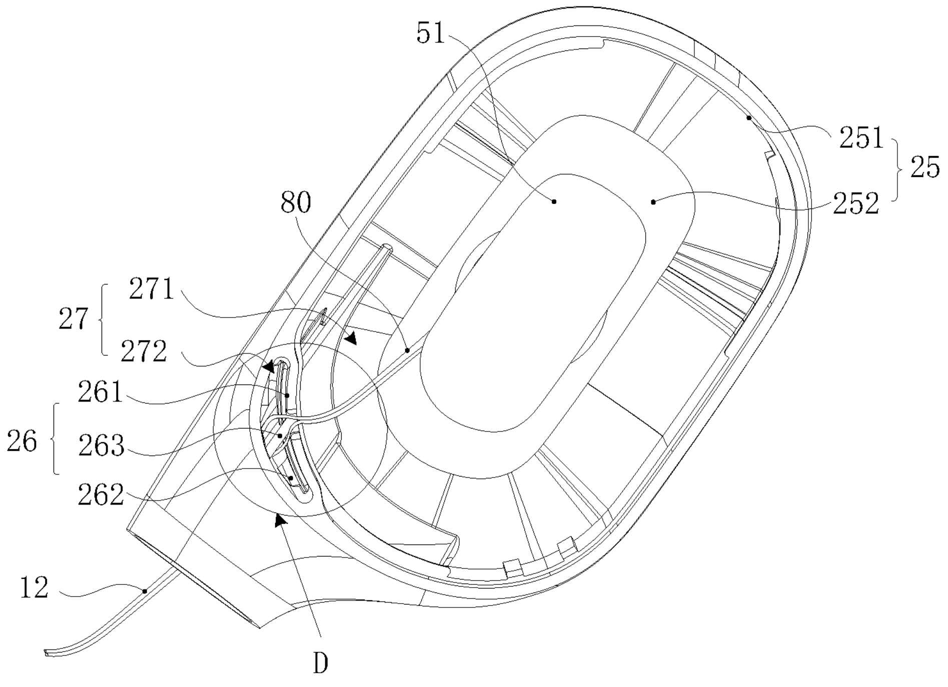
FIG. 7 is a schematic diagram illustrating a part of a structure of an exemplary core housing according to some embodiments of the present disclosure.
Figure 8:
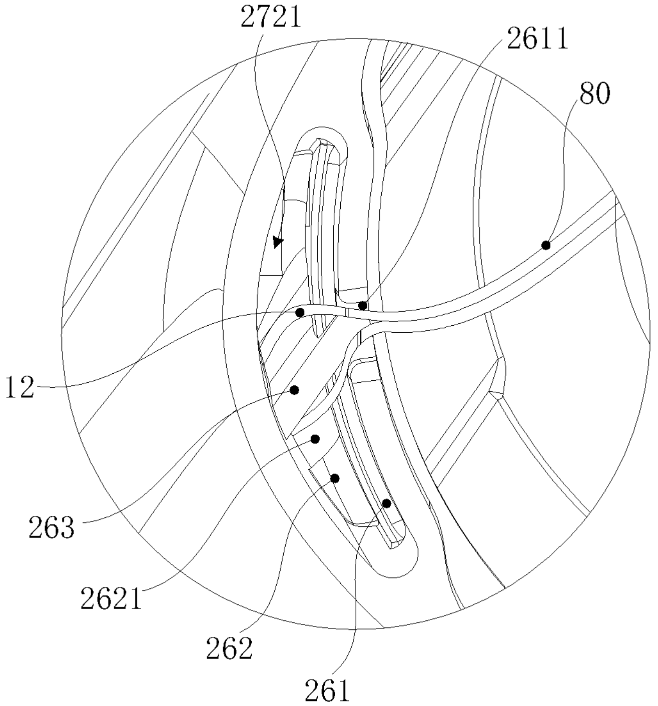
FIG. 8 is a schematic diagram illustrating a partially enlarged view of part D in FIG. 7 according to some embodiments of the present disclosure.
Figure 9:
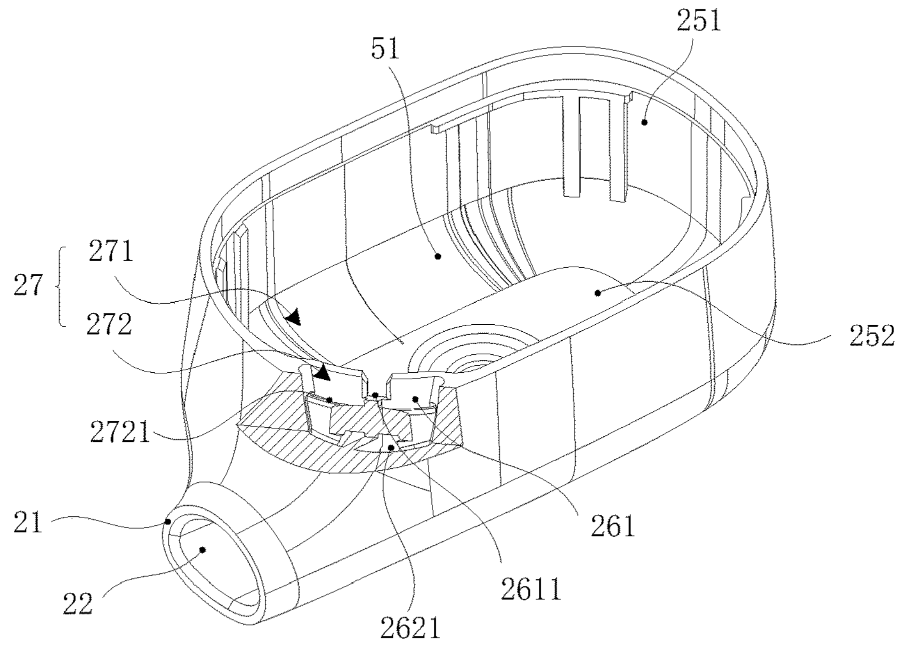
FIG. 9 is a schematic diagram illustrating a partial cross-section view of an exemplary core housing according to some embodiments of the present disclosure.

FIG. 7 is a schematic diagram illustrating a part of a structure of an exemplary core housing according to some embodiments of the present disclosure. FIG. 8 is a schematic diagram illustrating a partially enlarged view of part D in FIG. 7 according to some embodiments of the present disclosure. FIG. 9 is a schematic diagram illustrating a partial cross-section view of an exemplary core housing according to some embodiments of the present disclosure.

Referring to FIG. 2, FIG. 7, FIG. 8, and FIG. 9, in some embodiments, the core housing may include a main housing 25 and a partition assembly. In some embodiments, the partition assembly 26 may be located inside the main housing 25 and may be connected to the main housing 25, thereby separating an inner space 27 of the main housing 25 into a first accommodating space 271 and a second accommodating space 272 near a plug hole 22. In some embodiments, the main housing 25 may include a peripheral sidewall 251 and a bottom wall 252 connected to one end surface of the peripheral sidewall. The peripheral sidewall 251 and the bottom wall 252 may form the inner space 27 of the main housing 25.

In some embodiments, the partition assembly 26 may be located on one side of the main housing near the plug hole 22 and may include a side partition 261 and a bottom partition 262. The side partition 261 may be disposed along a direction perpendicular to the bottom wall 252, and two ends of the side partition 261 may be connected to the peripheral sidewall 251, thereby separating the inner space 27 of the main housing 25. The bottom partition 262 may be parallel or nearly parallel to the bottom wall 252 and spaced apart. The bottom partition 262 may be connected to the peripheral sidewall 251 and the side partition 261 respectively, thereby dividing the inner space 27 formed by the main housing 25 into two spaces, which are the first housing space surrounded by the side partition 261, the bottom partition 262, the peripheral sidewall 251 far away from the plug hole 22, and the bottom wall 252, and the second accommodating space 272 surrounded by the bottom partition 262, the side partition 261, and the peripheral sidewall 251 adjacent to the plug hole 22. The second accommodating space 272 may be smaller than the first accommodating space 271. In some embodiments, the partition assembly 26 may also divide the inner space 27 of the main housing 25 through other arrangements, which are not specifically limited here.

In some embodiments, the earphone core may include a functional component 51 that may be disposed in the first accommodating space 271 and used for vibrating and generating sound. In some embodiments, the MP3 player may further include a wire 80 connected to the functional component 51. An end of the wire 80 may be extended from the first accommodating space 271 to the second accommodating space 272.

In some embodiments, the side partition 261 may be disposed with a wiring groove 2611 at the top edge away from the bottom wall 252. The wiring groove 2611 may connect the first accommodation space 271 and the second accommodation space 272. Further, an end of the wire 12 away from the functional component may extend into the second accommodating space 272 through the wire groove 2611.

After the end of the wire 12 away from the circuit housing 30 entering the core housing 20 with the inserting portion 142, the end of the wire 12 may further extend into the second accommodating space 272 and be electrically connected to the wire 80 in the second accommodating space 272, so that a wire path connecting the first accommodating space 271 to an external circuit through the second accommodating space 272 may be formed. Thus, the functional component 51 may be electrically connected to the external circuit disposed outside the core housing 20 through the wire path.

In some embodiments, the bottom partition 262 may also be disposed with a wiring hole 2621, which connects the first socket 22 with the second accommodating space 272, so that the wire 12 entering the core housing from the first socket 22 may extend to the second accommodating space 272 through the wiring hole 2621.

The wire 12 and the wire 80 may be coiled and disposed in the second accommodating space 272 after being connected in the second accommodating space 272. Specifically, the wire 12 and the wire 80 may be connected together by welding. Further, the functional component 51 may be electrically connected to the external circuit, so as to provide power for the normal operation of the functional component 51 through the external circuit or transmit data to the earphone core 50.

It should be noted that when assembling the bone conductive MP3 player, the wire is often longer than the actual requirement to facilitate assembly. However, if the extra wires of the earphone core 50 may not be placed reasonably, it is easy to vibrate and make abnormal noises when the functional component 51 is working, thereby reducing the sound quality of the bone conductive MP3 player and affecting the user's experience of listening. In this embodiment, the second accommodating space 272 may be separated from the inner space 27 formed by the main housing 25 of the core housing 20 and used for accommodating extra wires 12 and wires 80, so as to avoid or reduce the influence of the extra wires on the sound generated by the bone conductive MP3 player due to vibration, thereby improving the sound quality.

In some embodiments, the partition component 26 may further include an inner partition 263. The inner partition 263 may further divide the second accommodating space 272 into two sub-accommodating spaces 2721. Specifically, the inner partition 263 may be disposed perpendicular to the bottom wall 252 of the main housing 25 and connected to the side partition 261 and the peripheral sidewall 251 respectively, and further extend to the wiring hole 2621, so as to divide the wiring hole 2621 into two, while dividing the second accommodating space 272 into two sub-accommodating spaces 2721. Each of the two wiring holes 2621 may be connected with a corresponding sub-accommodating space 2721 respectively.

In this embodiment, there are two wires 12 and two wires 80. The two wires 12 may extend into respective sub-accommodating spaces 2721 along the corresponding wiring holes 2621 respectively. The two wires 80 may enter the second accommodating space 272 through the wiring groove 2611 together, separate after entering the second accommodating space 272, be welded with the corresponding wires 12 in the corresponding sub-accommodating spaces 2721 respectively, and further be coiled and disposed in the corresponding sub-accommodating space 2721.

In some embodiments, the second accommodating space 272 may be further filled with sealant. In this way, the wire 12 and the wire 80 included in the second accommodating space 272 may be further fixed, which may reduce the adverse effect on the sound quality caused by the vibration of the wire, improve the sound quality of the bone conductive MP3 player, and protect the welding point between the wire 12 and the wire 80. In addition, the purpose of waterproof and dustproof may also be achieved by sealing the second accommodating space 272.

Referring to FIG. 2 and FIG. 3, in some embodiments, the circuit housing 30 and the second plug end 15 may be plugged and fixed, so that the circuit housing 30 may be fixed to the end of the ear hook 10 away from the core housing 20. When worn by the user, the circuit housing 30 including the battery 70 and the circuit housing 30 including the control circuit 60 may correspond to the left and right side of the user, respectively. The way of plug and connection of the circuit housing 30 and the control circuit 60 may be different from the corresponding plug end 15.

Specifically, the circuit housing 30 may be connected to the second plug end 15 through plug and connection, snap connection, or the like. In other words, in this embodiment, the ear hook 10 and the circuit housing 30 may be formed separately, and then be assembled after the form is completed, instead of directly forming the two together.

In this way, the ear hook 10 and the circuit housing 30 may be molded separately with respective corresponding molds, instead of using the same larger-sized mold to form the two integrally, which may reduce the size of the molding mold and the difficulty of mold process. In addition, since the ear hook 10 and the circuit housing 30 are processed by different molds, when the shape or structure of the ear hook 10 or the circuit housing 30 needs to be adjusted in the manufacturing process, it is sufficient to adjust the mold corresponding to the structure. There is no need to adjust the mold corresponding to another structure, so as to reduce the cost of production.

In some embodiments, the circuit housing 30 may be disposed with a second socket 31. A shape of the inner surface of the second socket 31 may match that of at least part of the outer end surface of the second plug end 15, so that the second plug end 15 may be at least partially inserted into the second socket 31.

Further, two slots 152 perpendicular to the inserted direction of the second plug end 15 with respect to the second socket 31 may be disposed on opposite sides of the second plug end 15, respectively. Specifically, the two slots 152 may be symmetric and spaced apart on opposite sides of the second plug end 15, and both be connected to the sidewall of the second plug end 15 in the vertical direction along the inserted direction.

Referring to FIG. 2, the circuit housing 30 may be flat. For example, the cross-section of the circuit housing 30 at the second socket 31 may be elliptical or other shapes that may be flattened. In this embodiment, two opposite sidewalls of the circuit housing 30 with a larger area may be main sidewalls 33 and the two opposite sidewalls with a smaller area connecting the two main sidewalls 33 may be auxiliary sidewalls 34.

It should be noted that the above descriptions of the MP3 player are merely provided for the purposes of illustration, and not intended to limit the scope of the present disclosure. For persons having ordinary skills in the art, multiple variations and modifications in forms and details of the specific methods and operations of implementing the MP3 player may be made under the teachings of the present disclosure. However, those variations and modifications do not depart from the scope of the present disclosure. For example, a count of the fixed sleeves 13 is not limited to the at least two described in the embodiments set forth above. The count of the fixed sleeves 13 may also be one, which may be specifically determined according to actual requirements. As another example, the shape of the cross-section of the circuit housing 30 at the second socket 31 may not be limited to be elliptical. The shape of the cross-section may also be other shapes, such as a triangle, a quadrilateral, a pentagon, and other polygons. Such variations and modifications do not depart from the scope of the present disclosure.

The speaker device described according to some embodiments of the present disclosure may include, but is not limited to, an earphone, an MP3 player, a hearing aid, etc. As shown in FIG. 2, in some embodiments, the position of the core housing 20 on the speaker device may not be fixed, and the core housing 20 may fit different parts of the user's cheek (e.g., in front of the ear, behind the ear, etc.), so that the user can feel different sound qualities and adjust the sound quality according to his/her preferences. It is also convenient for users with different head sizes. For example, the speaker device shown in FIG. 2 may be fixed on the human ear via the ear hook 10, and the core housing 20 may be located in front of the ear. In some embodiments, the ear hook 10 may be elastic and deformable, and the ear hook 10 may be bent to change the fitting positions of the core housing 20 on the human body. In some embodiments, a connecting end of the ear hook 10 and the core housing 20 may be set according to a position that the user is accustomed to. For example, if the user is used to placing the core housing 20 behind the ear, the connecting end of the ear hook 10 may be disposed behind the ear while maintaining the fixing function of the ear hook 10. More descriptions about the snap connection between the ear hook 10 and the core housing 20 may be found elsewhere in the present disclosure. It should be noted that the connection between the ear hook 10 and the core housing 20 may not be limited to the above-mentioned snap connection. For example, the ear hook 10 and the core housing 20 may also be connected via a hinge connection (e.g., a hinge assembly). More descriptions about the hinge connection may be found elsewhere in the present disclosure.

In some embodiments, the core housing 20 may fit any area on a user's head, for example, a top of the head, the forehead, the cheek, a sideburn, an auricle, a back of an auricle, etc. In some embodiments, the way of fitting the bone conduction earphone to the head may include a surface fitting or a point fitting. A fitting surface may be provided with a gradient structure. A gradient structure refers to an area of the contact surface where the height of the contact surface changes. The gradient structure may include a convex/concave structure or a step-like structure on an outside of the contact surface (i.e., the side that is attached to the user), or a convex/concave structure or a step-like structure on an inside of the contact surface (i.e., the side facing away from the user).

It should be noted that the above descriptions of the core housing are merely provided for the purposes of illustration, and not intended to limit the scope of the present disclosure. For persons having ordinary skills in the art, multiple variations and modifications in forms and details of the specific methods and operations of implementing the fitting may be made under the teachings of the present disclosure. However, those variations and modifications do not depart from the scope of the present disclosure. For example, a shape of the ear hook may not be limited to that shown in FIG. 2. The shape of the ear hook may be adjusted according to the fitting position of the core housing and the head of the human body. Such variations and modifications do not depart from the scope of the present disclosure.

Figure 10:
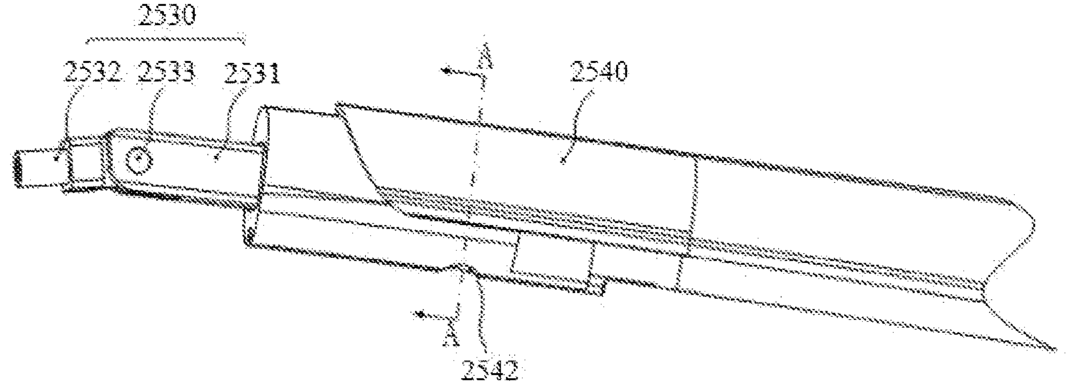
FIG. 10 is a schematic diagram illustrating a structure of an exemplary hinge component according to some embodiments of the present disclosure.
Figure 11:
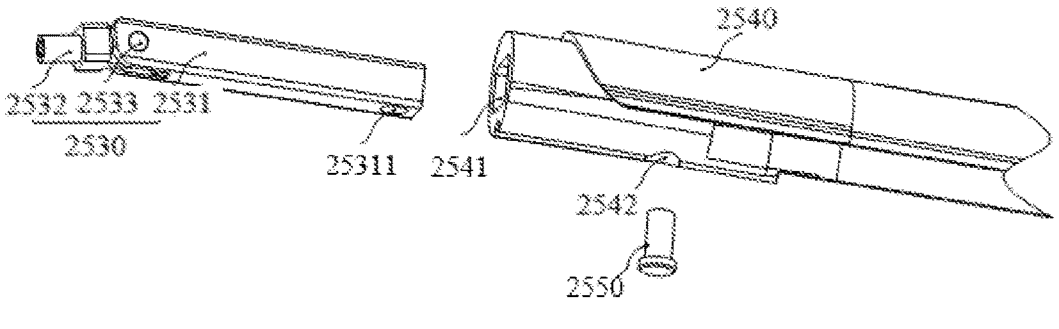
FIG. 11 is a schematic diagram illustrating an exploded structure of an exemplary hinge component according to some embodiments of the present disclosure.

FIG. 10 is a schematic structural diagram illustrating a structure of an exemplary hinge component according to some embodiments of the present disclosure. FIG. 11 is a schematic diagram illustrating an exploded structure of an exemplary hinge component according to some embodiments of the present disclosure. As shown in FIG. 10 and FIG. 11, the hinge component may include a hinge 2530, which is a structure used to connect two solid bodies and allow relative rotation between them. In some embodiments, the connection between the ear hook 10 and the core housing 20 may also be performed by means of the hinge joint. In some embodiments, the ear hook 10 and the core housing 20 may also be connected through a hinge, and a fitting position between the core housing 20 and a human skin may be adjusted by a hinge component.

Referring to FIG. 2, FIG. 10 and FIG. 11, the hinge component may be disposed at an end of the ear hook 10 away from the circuit housing 30. The hinge component may connect with the core housing 20 to the end of the ear hook 10 far from the circuit housing 30 through the hinge 2530. In some embodiments, the hinge component may include a rod-like component 2540 and a fixing component 2550. In some embodiments, the hinge 2530 may include a hinge base 2531 and a hinge arm 2532. The hinge arm 2532 may be rotatably connected to the hinge base 2531 through a rotation shaft 2533. The hinge base 2531 and the hinge arm 2532 may be respectively connected to two components that need to be rotationally connected. The two components may be rotationally connected together through the rotation shaft 2533 of the hinge 2530.

In some embodiments, the hinge base 2531 of the hinge 2530 may be connected to the rod-like component 2540. In some embodiments, the rod-like component 2540 may be a partial structure or an overall structure of one of the two members rotationally connected through the hinge 2530. In some embodiments, the rod-like component 2540 may be a connection structure in which one of the two members requiring rotational connection is connected to the hinge 2530. When the hinge component is used in an MP3 player, the rod-like component 2540 may be at least a part of the ear hook 10 of the MP3 player. For example, the rod-like component 2540 may be all of the ear hook 10. As another example, the rod-like component 2540 may be part of the end of the ear hook 10 away from the circuit housing 30. In some embodiments, the hinge 2530 may be set at the end of the ear hook away from the circuit housing 30 through the part of the ear hook 10.

In some embodiments, the rod-like component 2540 may be disposed along the length direction with a hinge cavity 2541 communicating with the end surface of the rod-like component 2540. A sidewall of the rod-like component 2540 may be disposed with a first insertion hole 2542 communicating with the hinge cavity 2541. The end of the hinge base 2531 away from the hinge arm 2532 may be inserted into the hinge cavity 2541 from the end surface of the rod-like component 2540, and may be fixed in the hinge cavity 2541 by the fixing component 2550 inserted in the first insertion hole 2542. In some embodiments, the hinge cavity 2541 may communicate with the ear hook 10 away from the end face of the end of the circuit housing 30. The hinge base 2531 may be inserted into the hinge cavity 2541. The hinge 2530 may be connected to the ear hook 10.

In some embodiments, the first insertion hole 2542 may be formed by the rod-like component 2540 during the molding process, or may be formed on the sidewall of the rod-shaped member by a mean such as drilling after the molding. In some embodiments, the shape of the first insertion hole 2542 may be circular. In some embodiments, the shape of the first insertion hole 2542 may be other shapes (e.g., a square, a triangle, etc.). The shape of the fixing component 2550 may match the shape of the first insertion hole 2542. The fixing component 2550 may be inserted into the first insertion hole 2542 from the outside of the rod-like component 2540. The hinge base 2531 may be fixed in the hinge cavity 2541 by abutting the sidewall of the hinge base 2531. In some embodiments, the hinge base 2531 may be fixed in the hinge cavity 2541 by penetrating and inserting into the outer wall of the hinge base 2531. In some embodiments, a matching thread may be disposed on the inner wall of the first insertion hole 2542 and the outer wall of the fixing component 2550. The fixing component 2550 may be connected to the first insertion hole 2542 by screwing to further fix the hinge base 2531 in the hinge cavity 2541. In some embodiments, the first insertion hole 2542 and the fixing component 2550 may be connected by an interference fit.

In some embodiments, the hinge arm 2532 may be connected with other components. After connecting with the hinge arm 2532, the component may be further able to rotate around the rotation shaft 2533 by being mounted in the hinge cavity 2541 of the rod-like component 2540 with the hinge base 2531 or other components connected with the rod-like component 2540. For example, when the hinge component is used in the MP3 player, the core housing 20 may be connected to the end of the hinge arm 2532 away from the hinge base 2531. The core housing 20 of the earphone core 50 may be connected to the end of the ear hook 10 away from the circuit housing 30 through the hinge 2530.

In some embodiments, the rod-like component 2540 may be disposed with the hinge cavity 2541 connected to an end surface of the rod-like component 2540. The hinge 2530 may accommodate the hinge base 2531 in the hinge cavity 41, and further penetrate the fixing component 2550 through the sidewall of the rod-like component 2540 through the first insertion hole 2542, thereby fixing the hinge base 2531 accommodated in the hinge cavity 2541 in the hinge cavity 2541. The hinge 2530 may be detached from the rod-like component 2540 to facilitate replacement of the hinge 2530 or the rod-like component 2540. In some embodiments, the hinge 2530 and the core housing 20 of the MP3 player may be detachable relative to the ear hook 10, thereby facilitating replacement when the core housing 20 of the earphone core 50 or the ear hook 10 is damaged.

In some embodiments, the hinge base 2531 may be disposed with a second insertion hole 25311 corresponding to the first insertion hole 2542. The fixing component 2550 may be further inserted into the second insertion hole 25311. In some embodiments, the shape of the second insertion hole 25311 may match the shape of the fixing component 2550. The fixing component 2550 may be inserted into the second insertion hole 25311 to fix the hinge base 2531 after passing through the first insertion hole 2542. The shaking of the hinge base 2531 in the hinge cavity 2541 may be reduced, and the hinge 2530 may be fixed more firmly. In some embodiments, the inner wall of the second insertion hole 25311 may be disposed with matching threads on the outer wall corresponding to the fixing component 2550. The fixing component 2550 and the hinge base 2531 may be screwed together. In some embodiments, the inner wall of the second insertion hole 25311 and the outer sidewall at the corresponding contact positions of the fixing component 2550 may be smooth surfaces. The fixing component 2550 and the second insertion hole 25311 may be in an interference fit. In some embodiments, the second insertion hole 25311 may be disposed through both sides of the hinge base 2531. The fixing component 2550 may further penetrate the entire hinge base 2531. The hinge base 2531 may be firmly fixed in the hinge cavity 2541.

In some embodiments, the cross-sectional shape of the hinge base 2531 may match the cross-sectional shape of the hinge cavity 2541 in a cross section perpendicular to the length direction of the rod-like component 2540. A seal may be formed between the hinge base 2531 and the rod-like component 2540 after insertion. In some embodiments, the cross-sectional shape of the hinge base 2531 and the cross-sectional shape of the hinge cavity 2541 may be any shapes, as long as the hinge base 2531 may be inserted into the hinge cavity 2541 from the end of the rod-like component 2540 away from the hinge arm 2532. In some embodiments, the first insertion hole 2542 may be disposed on the sidewall of the hinge cavity 2541, penetrate the sidewall of the hinge cavity 2541 and communicate with the hinge cavity 2541.

In some embodiments, the cross-sectional shape of the hinge base 2531 and the cross-sectional shape of the hinge cavity 2541 may be both rectangular. The first insertion hole 2542 may be perpendicular to one side of the rectangle. In some embodiments, the corners of the outer wall of the hinge base 2531 or the corners of the inner wall of the hinge cavity 2541 may be rounded. The contact between the hinge base 2531 and the hinge cavity 2541 may be smooth. The hinge base 2531 may be smoothly inserted into the hinge cavity 2541.

In some embodiments, the hinge component may include a connection line provided outside the hinge 2530. In some embodiments, the connection line may be a connection line having an electrical connection function and/or a mechanical connection function. The hinge component may be configured to connect the end of core housing 20 and the ear hook 10 away from the circuit housing 30. The control circuit or the like related to the core housing 20 may be disposed in the ear hook 10 or the circuit housing 30. The connecting wire 2560 may electrically connect a core housing 20 with a control circuit in the ear hook 10 or the circuit housing 30. In some embodiments, the connecting wire 2560 may be located at one side of the hinge base 2531 and the hinge arm 2532. The hinge 2530 may be disposed in the same accommodation space.

In some embodiments, the hinge base 2531 may include a first end surface. The hinge arm 2532 may have a second end surface opposite to the first end surface. It is easily understood that there is a certain gap between the first end surface and the second end surface, so that the hinge base 2531 and the hinge arm 2532 may be relatively rotated around the rotation shaft 2533. In some embodiments, during the relative rotation of the hinge arm 2532 and the hinge base 2531, the relative position between the first end surface and the second end surface changes accordingly, so that the gap between the two becomes larger or smaller.

In some embodiments, the gap between the first end surface and the second end surface may be always larger than or less than the diameter of the connecting wire 2560. The connecting wire 2560 located outside the hinge 2530 may not be caught in the gap between the first end surface and the second end surface during the relative rotation of the hinge base 2531 and the hinge arm 2532, thereby reducing the damage of the connecting wire 2560 by the hinge. In some embodiments, the ratio of the gap between the first end surface and the second end surface to the diameter of the connection line during the relative rotation of the hinge arm 2532 and the hinge base 2531 may always be greater than 1.5 (e.g., greater than 1.5, 1.7, 1.9, 2.0, etc.) or less than 0.8 (e.g., less than 0.8, 0.6, 0.4, 0.2, etc.).

Figure 12:
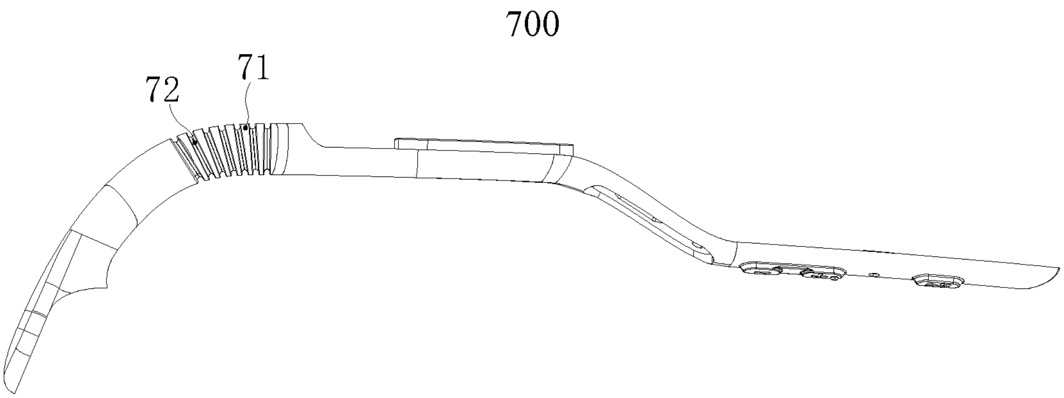
FIG. 12 is a schematic diagram illustrating a structure of an exemplary hinge component according to some embodiments of the present disclosure.
Figure 13:
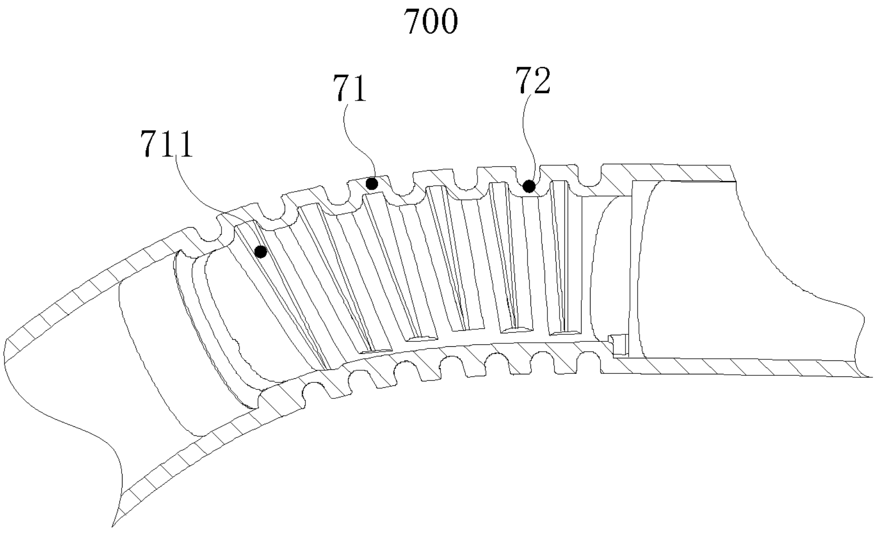
FIG. 13 is a schematic diagram illustrating a partial cross-sectional view of an exemplary hinge component according to some embodiments of the present disclosure.

FIG. 12 is a schematic diagram illustrating a structure of an exemplary hinge component according to some embodiments of the present disclosure. FIG. 13 is a schematic diagram illustrating a partial cross-sectional view of an exemplary hinge component according to some embodiments of the present disclosure. As shown in FIG. 12 and FIG. 13, in some embodiments, the hinge component may further include a protective sleeve 700. The protective sleeve 700 may be sleeved on the periphery of the hinge 2530 and may be bent along with the hinge 2530. In some embodiments, the protective sleeve 700 may include a plurality of annular ridge portions 71 spaced apart along the length direction of the protective sleeve 700 and an annular connection part 72 provided between the annular ridge portions 71. The protective sleeve 700 may be used to connect two adjacent annular ridge portions. In some embodiments, the tube wall thickness of the annular ridge portion 71 may be greater than the tube wall thickness of the annular connection part 72. The length direction of the protective sleeve 700 may be consistent with the length direction of the hinge 2530. The protection sleeve 70 may be specifically disposed along the length direction of the hinge base 2531 and the hinge arm 2532. The protective sleeve 700 may include soft material, such as soft silicone, rubber, or the like, or any combination thereof.

In some embodiments, the annular ridge portion 71 may be formed by protruding outwardly from the outer sidewall of the protective sleeve 700. The shape of the inner sidewall of the protective sleeve 700 corresponding to the annular ridge portion 71 may be not limited herein. For example, the surface of the inner wall may be smooth. As another example, a recess on the inner wall may be disposed at a position corresponding to the annular ridge portion 71. The annular connection part 72 may be configured to connect adjacent annular ridge portions 71, specifically connected to the edge region of the annular ridge portion 71 near the inside of the protective sleeve 700. A side of the outer wall of the protective sleeve 700 may be disposed in a recess with respect to the annular ridge portion 71.

When the hinge base 2531 and the hinge arm 2532 of the hinge 2530 are relatively rotated around the rotation shaft 2533, the angle between the hinge base 2531 and the hinge arm 2532 may change. The protective sleeve 700 may be bent. In some embodiments, when the protective sleeve 700 is bent with the hinge 2530, the annular ridge 71 and the annular connection part 72 located in the outer region of the bent shape formed by the protective sleeve 700 may be in a stretched state. The annular ridge 71 and annular connection part 72 located in the inner region of the bent shape may be in a squeezed state.

The tube wall thicknesses of the annular ridge portion 71 and the annular connection part 72 may refer to the thickness between the inner and outer walls of the protective sleeve 700 corresponding to the annular ridge portion 71 and the annular connection part 72, respectively. In some embodiments, the thickness of the pipe wall of the annular ridge portion 71 may be greater than the thickness of the pipe wall of the annular connection part 72. The annular ridge portion 71 may be harder than the annular connection part 72. Therefore, when the protective sleeve 700 is in a bent state, the protective sleeve 700 on the outer side of the bent shape may be in a stretched state. The annular ridge portion 71 may provide a certain strength support for the protective sleeve 700. When the protective sleeve 700 that is on the inner side and in the bent state is squeezed, the annular ridge portion 71 may withstand a certain pressing force, thereby protecting the protective sleeve 700 and improving the stability of the protective sleeve 700. The service life of the protective sleeve 700 may be extended.

In some embodiments, the shape of the protective sleeve 700 may be consistent with the state of the hinge 2530. In some embodiments, two sides of the protective sleeve 700 along the length direction and rotated around the rotation axis may be stretched or squeezed. In some embodiments, the hinge base 2531 and the hinge arm 2532 of the hinge 2530 may only rotate around the rotation shaft 2533 within a range of less than or equal to 180°. The protective sleeve 700 may only be bent toward one side, then one side of the two sides of the protective sleeve 700 in the length direction may be squeezed. The other side may be stretched. At this time, according to the different forces on both sides of the protective sleeve 700, the two sides of the protective sleeve 700 under different forces may have different structures.

In some embodiments, the width of the annular ridge portion 71 along the length direction of the protective sleeve 700 when the protective sleeve 700 is in a bent state toward the outside of the bent shape formed by the protective sleeve 700 may be greater than the width in the longitudinal direction of the protective sleeve 700 toward the inside of the bent shape. Increasing the width of the annular ridge 71 in the length direction of the protective sleeve 700 may further increase the strength of the protective sleeve. In some embodiments, the angle of the initial angle between the hinge base 2531 and the hinge arm 2532 may be less than 180°. If the annular ridges 71 of the protective sleeve 700 are evenly arranged, the protective sleeve 700 will be squeezed in the original state. In some embodiments, the width of the annular ridge 71 corresponding to the outer region side of the bent shape in the bent state is larger, thereby enlarging the length of the side protective sleeve 700. The strength of the protective sleeve 700 may be improved. The extent of the stretching side may be reduced when the protective sleeve 700 is bent. At the same time, the width of the annular ridge portion 71 along the longitudinal direction of the protective sleeve 700 may be smaller when the protective sleeve 700 is in a bent state toward the inner region side of the bent shape, which can increase the space of the extruded annular connection part 72 in the length direction of the protective sleeve 700 and alleviate the extrusion of the extrusion side.

In some embodiments, the width of the annular ridge portion 71 may gradually decrease from the side of the outer region toward the bent shape to the side of the inner region toward the bent shape. When the protective sleeve 700 is in the bent state, the width toward the outer region side of the bent shape formed by the protective sleeve 700 may be greater than the width toward the inner region side of the bent shape. The annular ridge portion 71 may be disposed around the periphery of the protective sleeve 700. In the length direction of the protective sleeve 700, one side corresponds to the stretched side, and the other side corresponds to the squeezed side. In some embodiments, the width of the annular ridge portion 71 may gradually decrease from the side of the outer region facing the bent shape to the side of the inner region facing the bent shape, thereby making the width more uniform. The stability of the protective sleeve 700 may be improved.

In some embodiments, when the protective sleeve 700 is in a bent state, the annular ridge portion 71 may be disposed with a groove 711 on an inner circumferential surface of the protective sleeve 700 inside the protective sleeve 700 on the outer region side of the bent shape formed by the protective sleeve 700. The groove 711 may be disposed along a length direction perpendicular to the protective sleeve 700. The corresponding annular ridge portion 71 may be appropriately extended when the protective sleeve 700 is stretched in the length direction. When the protective sleeve 700 is in a bent state, the protective sleeve 700 on the outer side of the bent shape formed by the protective sleeve 700 may be in a stretched state. A groove 711 may be disposed on the inner ring surface inside the protective sleeve 700 corresponding to the corresponding annular ridge portion 71, so that when the side protective sleeve is stretched, the annular ridge portion 71 corresponding to the groove 711 may be appropriately extended to bear a partial stretch, thus reducing the tensile force experienced by the side protective sleeve, thereby protecting the protective sleeve 700.

It should be noted that when the protective sleeve 700 is in a bent state, the annular ridge portion 71 on the side facing the inner region of the bent shape may not be disposed with a groove 711 on the inner sidewall of the corresponding protective sleeve 700. In some embodiments, the width of the groove 711 along the length of the protective sleeve 700 gradually decreases from the side of the outer region facing the bent shape to the side of the inner region facing the bent shape, so that no groove 711 is disposed on the inner sidewall of the protective sleeve 700 corresponding to the annular ridge portion 71 facing the inner region side of the bent shape.

In some embodiments, when the hinge component is applied to a speaker device of the present disclosure, the protective sleeve 700 may be connected to the ear hook 10 and the core housing 20 which are respectively disposed on both sides in the longitudinal direction of the protective sleeve 700. In some embodiments, the protective sleeve 700 may also be other structures in the speaker device. For example, the protective cover of some components may be integrally formed, so that the speaker device may be more closed and integrated.

It should be noted that the hinge component in the present disclosure embodiment may not only be used in the MP3 player of the speaker device, but may also be used in other apparatuses, such as glasses, the headphone, and the hearing aid. In some embodiments, the hinge component may also include the rod-like component 2540, the fixing component 2550, the connecting wire 2560, the protective sleeve 700, etc., or other components related to the hinge 2530. The hinge component may realize the corresponding functions of the other components.

It should be noted that the above description regarding the MP3 player is merely an example, and should not be considered as a uniquely possible implementation. Obviously, for those skilled in the art, after understanding the basic principles of the MP3 player, the specific ways and steps of the implementation of the MP3 player may be modified or changed without departing from the principle. For example, a count of annular ridge portion 71 and the annular connection part 72 may be not limited to the figure, and may be determined according to the actual use. Further, for example, the count of annular ridge portion 71 and the annular connection part 72 may be set according to a length of the protective sleeve 700, a width of the annular ridge portion 71 and the annular connection part 72 along the length of the protective sleeve 700. Such modifications are within the scope of the present disclosure.

Figure 14:
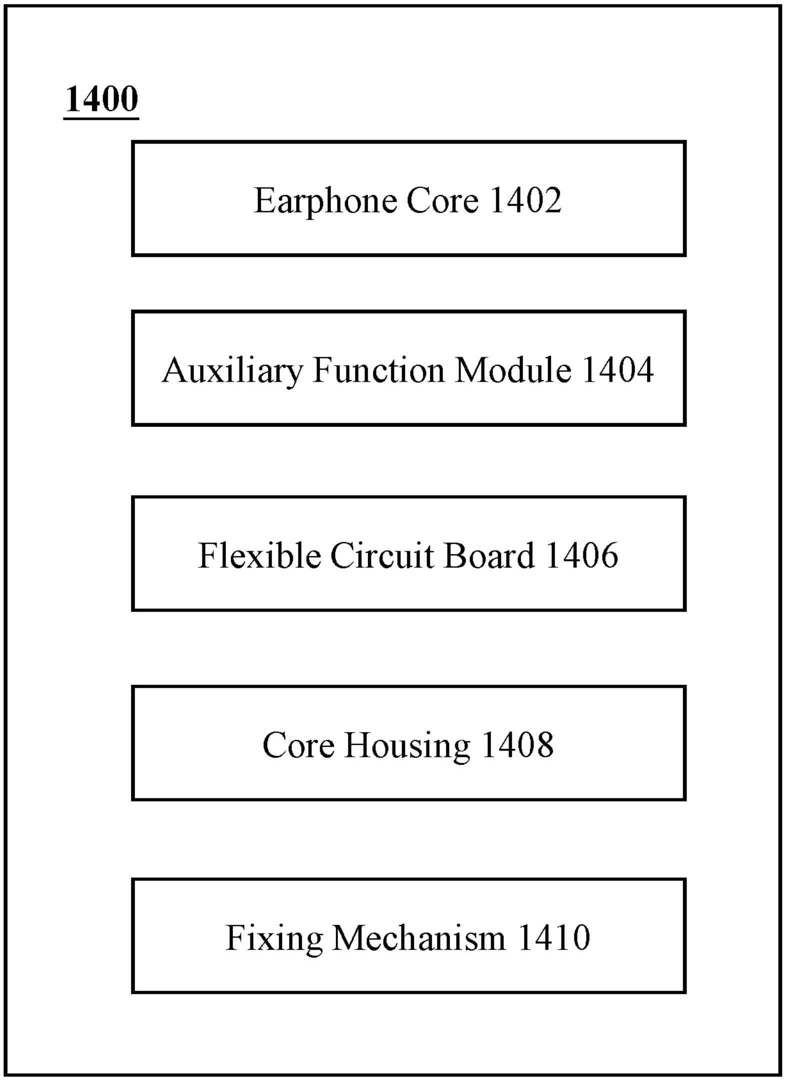
FIG. 14 is a block diagram illustrating an exemplary speaker device according to some embodiments of the present disclosure.

FIG. 14 is a block diagram illustrating an exemplary speaker device according to some embodiments of the present disclosure. In some embodiments, the speaker device 1400 may at least include an earphone core 1402, an auxiliary function module 1404, and a flexible circuit board 1406.

In some embodiments, the earphone core 1402 may be configured receive an audio electrical signal and convert the audio electrical signal into a sound signal. The flexible circuit board 1406 may be configured to provide electrical connections between different modules/components. For example, the flexible circuit board 1406 may provide electrical connection between the earphone core 1402 and the external control circuit and/or auxiliary function module 1404.

In some embodiments, the earphone core 1402 may at least include a magnetic circuit assembly, a vibration assembly, and a bracket configured for accommodating the magnetic circuit assembly and the vibration assembly. The magnetic circuit assembly may be configured to provide a magnetic field, and the vibration component may be configured to convert received audio electrical signal to a mechanical vibration signal, and generate sound. In some embodiments, the vibration component may include at least a coil and an internal lead. In some embodiments, the earphone core 1402 may further include an external wire, which can transmit audio current to the coil in the vibration component. One end of the external lead may be connected to the internal lead of the earphone core, and one end of the external lead may be connected to the flexible circuit board 1406 of the speaker device. In some embodiments, the bracket may include a wiring groove, and the external wire and/or the inner wire may be partially disposed in the wiring groove. More descriptions may be found elsewhere in the present disclosure.

In some embodiments, the auxiliary function module 1404 may be used to receive auxiliary signal(s) and perform auxiliary function(s). The auxiliary function module 1404 may be a module different from the earphone core and may be used for receiving the auxiliary signal(s) and performing the auxiliary function(s). In the present disclosure, the conversion of the audio signal into the sound signal may be considered as a main function of the speaker device 1400, and other functions different from the main function may be considered as the auxiliary function(s) of the speaker device 1400. For example, the auxiliary function(s) of the speaker device 1400 may include receiving a user sound and/or an ambient sound through a microphone, controlling a broadcasting process of the sound signal through a button, or the like, and a corresponding auxiliary function module may include a microphone, a button switch, etc., which may be set according to actual needs. The auxiliary signal(s) may be electric signal(s) related to the auxiliary function(s), optical signal(s) related to the auxiliary function(s), acoustic signal(s) related to the auxiliary function(s), vibration signal(s) related to the auxiliary function(s), or the like, or any combination thereof.

The speaker device 1400 may further include a core housing 1408 for accommodating the earphone core 1402, the auxiliary function module 1404, and the flexible circuit board 1406. When the speaker device 1400 is an MP3 player as described according to some embodiments of the present disclosure, an inner wall of the core housing 1408 may be directly or indirectly connected to the vibration component in the earphone core. When the user wears the MP3 player, an outer wall of the core housing 1408 may be in contact with the user and transmit the mechanical vibration of the vibration component to an auditory nerve through a bone, so that the human body may hear the sound. In some embodiments, the speaker device may include the earphone core 1402, the auxiliary function module 1404, the flexible circuit board 1406, and the core housing 1408.

In some embodiments, the flexible circuit board 1406 may be a flexible printed circuit board (FPC) accommodated in the inner space of the core housing 1408. The flexible circuit board 1406 may have high flexibility and be adapted to the inner space of the core housing 1408. Specifically, in some embodiments, the flexible circuit board 1406 may include a first board and a second board. The flexible circuit board 1406 may be bent at the first board and the second board so as to adapt to a position of the flexible circuit board in the core housing 1408, or the like. More details may refer to descriptions in other parts of the present disclosure.

In some embodiments, the speaker device 1400 may transmit the sound through a bone conduction approach. An outer surface of the core housing 1408 may have a fitting surface. The fitting surface may be an outer surface of the speaker device 1400 in contact with the human body when the user wears the speaker device 1400. The speaker device 1400 may compress the fitting surface against a preset area (e.g., a front end of a tragus, a position of a skull, or a back surface of an auricle), thereby effectively transmitting the vibration signal(s) to the auditory nerve of the user through the bone and improving the sound quality of the speaker device 1400. In some embodiments, the fitting surface may be abutted on the back surface of the auricle. The mechanical vibration signal(s) may be transmitted from the earphone core to the core housing and transmitted to the back of the auricle through the fitting surface of the core housing. The vibration signal(s) may then be transmitted to the auditory nerve by the bone near the back of the auricle. In this case, the bone near the back of the auricle may be closer to the auditory nerve, which may have a better conduction effect and improve the efficiency of transmitting the sound to the auditory nerve by the speaker device 1400.

In some embodiments, the speaker device 1400 may further include a fixing mechanism 1410. In some embodiments, the fixing mechanism 1410 may be a part or the entire of the ear hook 10 shown in FIG. 2. The fixing mechanism 1410 may be externally connected to the core housing 1408 and used to support and maintain the position of the core housing 1408. In some embodiments, a battery assembly and a control circuit may be disposed in the fixing mechanism 1410. The battery assembly may provide electric energy to any electronic component in the speaker device 1400. The control circuit may control any function component in the speaker device 1400. The function component may include, but be not limited to, the earphone core, the auxiliary function module, or the like. The control circuit may be connected to the battery and other functional components through the flexible circuit board or the wire.

Figure 15:
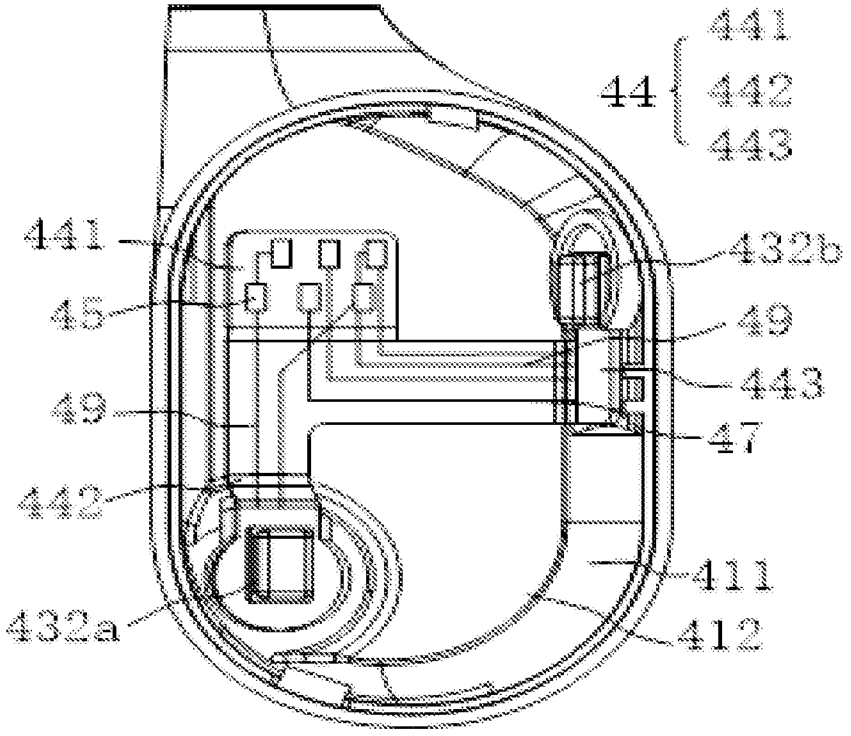
FIG. 15 is a schematic diagram illustrating an exemplary structure of a flexible circuit board located inside a core housing according to some embodiments of the present disclosure.

FIG. 15 is a schematic diagram illustrating a structure of an exemplary flexible circuit board located inside a core housing according to some embodiments of the present disclosure.

Figure 16:
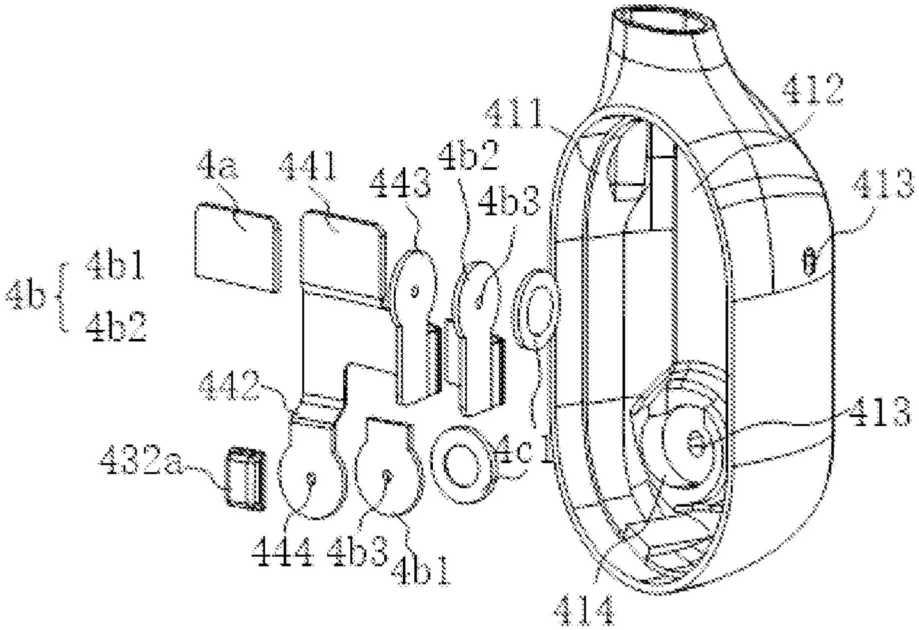
FIG. 16 is a schematic diagram illustrating an exploded structure of an exemplary core housing according to some embodiments of the present disclosure.

In some embodiments, the flexible circuit board may be disposed with a plurality of pads. Different signal wires (e.g., audio signal wires, auxiliary signal wires) may be electrically connected to different pads through different flexible leads to avoid numerous and complicated internal wires issues, which may occur when both audio signal wires and auxiliary signal wires need to be connected to the earphone core or the auxiliary function module. As shown in FIG. 15 and FIG. 16, a flexible circuit board 44 may at least include a plurality of first pads 45 and a plurality of second pads (not shown in the figures). In some embodiments, the flexible circuit board 44 in FIG. 15 may correspond to the flexible circuit board 1406 in FIG. 14. At least one of the first pads 45 may be electrically connected to auxiliary function module(s). The at least one of the first pads 45 may be electrically connected to at least one of the second pads through a first flexible lead 47 on the flexible circuit board 44. The at least one of the second pads may be electrically connected to an earphone core (not shown in the figures) through external wire(s) (not shown in the figures). At least another one of the first pads 45 may be electrically connected to auxiliary signal wire(s). The at least another one of the first pads 45 and the auxiliary function module(s) may be electrically connected through a second flexible lead 49 on the flexible circuit board 44. In the embodiment, the at least one of the first pads 45 may be electrically connected to the auxiliary function module(s). The at least one of the second pads may be electrically connected to the earphone core through the external wire(s). The one of the at least one of the first pads 45 may be electrically connected to one of the at least one of the second pads through the first flexible lead 47, so that the external audio signal wire(s) and the auxiliary signal wire(s) may be electrically connected to the earphone core and the auxiliary function modules at the same time through the flexible circuit board, which may simplify a layout of the wiring.

In some embodiments, the audio signal wire(s) may be wire(s) electrically connected to the earphone core and transmitting audio signal(s) to the earphone core. The auxiliary signal wire(s) may be wire(s) electrically connected to the auxiliary function modules and performing signal transmission with the auxiliary function modules.

In some embodiments, referring to FIG. 15, specifically, the flexible circuit board 44 may be disposed with the plurality of pads 45 and two pads (not shown in the figure). The two pads and the plurality of pads 45 may be located on the same side of the flexible circuit board 44 and spaced apart. The two pads may be connected to two corresponding pads 45 of the plurality of pads 45 through the flexible lead(s) 47 on the flexible circuit board 44. Further, a core housing 41 may also accommodate two external wires. One end of each of the external wires may be welded to the corresponding pad, and the other end may be connected to the earphone core, so that the earphone core may be connected to the pads through the external wires. The auxiliary function modules may be mounted on the flexible circuit board 44 and connected to other pads of the plurality of pads 45 through the flexible lead(s) 49 on the flexible circuit board 44.

In some embodiments, wires may be disposed in the fixing mechanism 1410 of the speaker device 1400. The wires may at least include the audio signal wire(s) and the auxiliary signal wire(s). In some embodiments, there may be multiple wires in the fixing mechanism 1410. The wires may include at least two audio signal wires and at least two auxiliary signal wires. For example, the fixing mechanism 1410 may be the ear hook 10 as shown in FIG. 15. The ear hook 10 may be connected to the core housing 41, and the wires may be disposed in the ear hook 10. One end of the plurality of the wires in the ear hook 10 may be welded to the flexible circuit board 44 or a control circuit board disposed in the core housing 41, and the other end of the plurality of the wire may enter the core housing 41 and be welded to the pad 45 on the flexible circuit board 44.

In some embodiments, one end of each of the two audio signal wires of the plurality of wires in the ear hook 10, which may be located in the core housing 41, may be welded to the two pads 45 by two flexible leads 47, and the other end may be directly or indirectly connected to the control circuit board. The two pads 45 may be further connected to the earphone core through the welding of the flexible lead(s) 49 and the two pads and the welding of the two external wires and the pads, thereby transmitting the audio signal(s) to the earphone core.

One end of each of at least two auxiliary signal wires in the core housing 41 may be welded to the pad 45 by the flexible lead(s) 49, and the other end may be directly or indirectly connected to the control circuit board so as to transmit the auxiliary signal(s) received and transformed by the auxiliary function module(s) to the control circuit (not shown in the figure).

In the approach described above, the flexible circuit board 44 may be disposed in the core housing 41, and the corresponding pads may be further disposed on the flexible circuit board 44. Therefore, the wires (not shown in the figure) may enter the core housing 41 and be welded to the corresponding pads, and further connected to the corresponding auxiliary function module(s) through the flexible leads 47 and the flexible leads 49 on the pads, thereby avoiding a plurality of wires directly connected to the auxiliary function module(s) to make the wiring in the core housing 41 complicated. Therefore, the arrangement of the wirings may be optimized, and the space occupied by the core housing 41 may be saved. In addition, when a plurality of the wires in the ear hook 10 are directly connected to the auxiliary function module(s), a middle portion of the wires in the ear hook 10 may be suspended in the core housing 41 to easily cause vibration, thereby resulting in abnormal sounds to affect the sound quality of the earphone core. According to the approach, the wires in the ear hook 10 may be welded to the flexible circuit board 44 and further connected to the corresponding auxiliary function module(s), which may reduce a situation that the wires are suspended from affecting the quality of the earphone core, thereby improving the sound quality of the earphone core to a certain extent.

In some embodiments, the flexible circuit board (also referred to as the flexible circuit board 44) may be further divided. The flexible circuit board may be divided into at least two regions. One auxiliary function module may be disposed on one of the at least two regions, so that at least two auxiliary function modules may be disposed on the flexible circuit board. Wiring between the audio signal wire(s) and the auxiliary signal wire(s) and the at least two auxiliary function modules may be implemented through the flexible circuit board. In some embodiments, the flexible circuit board may at least include a main circuit board and a first branch circuit board. The first branch circuit board may be connected to the main circuit board and extend away from the main circuit board along one end of the main circuit board. The auxiliary function module(s) may include at least a first auxiliary function module and a second auxiliary function module. The first auxiliary function module may be disposed on the main circuit board, and the second auxiliary function module may be disposed on the first branch circuit board. The plurality of first pads may be disposed on the main circuit board, and the second pads may be disposed on the first branch circuit board. In some embodiments, the first auxiliary function module may be a button switch. The button switch may be disposed on the main circuit board, and the first pads may be disposed corresponding to the button switch. The second auxiliary function module may be a microphone. The microphone may be disposed on the first branch circuit board, and the second pads corresponding to the microphone may be disposed on the first branch circuit board. The first pads corresponding to the button switch on the main circuit board may be connected to the second pads corresponding to the microphone on the first branch circuit board through the second flexible lead(s). The button switch may be electrically connected to the microphone, so that the button switch may control or operate the microphone.

In some embodiments, the flexible circuit board may further include a second branch circuit board. The second branch circuit board may be connected to the main circuit board. The second branch circuit board may extend away from the main circuit board along the other end of the main circuit board and be spaced from the first branch circuit board. The auxiliary function module(s) may further include a third auxiliary function module. The third auxiliary function module may be disposed on the second branch circuit board. The plurality of first pads may be disposed on the main circuit board. At least one of the second pads may be disposed on the first branch circuit board, and the other second pads may be disposed on the second branch circuit. In some embodiments, the third auxiliary function module may be a second microphone. The second branch circuit board may extend perpendicular to the main circuit board. The second microphone may be mounted on the end of the second branch circuit board away from the main circuit board. The plurality of pads may be disposed at the end of the main circuit board away from the second branch circuit board.

Specifically, as shown in FIG. 15 and FIG. 16, the second auxiliary function module may be the first microphone 432*a*. The third auxiliary function module may be the second microphone 432*b*. As used herein, the first microphone 432*a* and the second microphone 432*b* may both be MEMS (micro-electromechanical system) microphones, which may have a small working current, relatively stable performance, and high voice quality. The two microphones 432 may be disposed at different positions of the flexible circuit board 44 according to actual needs.

In some embodiments, the flexible circuit board 44 may include a main circuit board 441 (or referred to the main circuit board), and a branch circuit board 442 (or referred to the first branch circuit board) and a branch circuit board 443 (or referred to the second branch circuit board) connected to the main circuit board 441. The branch circuit board 442 may extend in the same direction as the main circuit board 441. The first microphone 432*a* may be mounted on one end of the branch circuit board 442 away from the main circuit board 441. The branch circuit board 443 may extend perpendicular to the main circuit board 441. The second microphone 432*b* may be mounted on one end of the branch circuit board 443 away from the main circuit board 441. A plurality of pads 45 may be disposed on the end of the main circuit board 441 away from the branch circuit board 442 and the branch circuit board 443.

In one embodiment, the core housing 41 may include a peripheral side wall 411 and a bottom end wall 412 connected to one end surface of the peripheral side wall 411, so as to form an accommodation space with an open end. As used herein, an earphone core may be disposed in the accommodation space through the open end. The first microphone 432*a* may be fixed on the bottom end wall 412. The second microphone 432*b* may be fixed on the peripheral side wall 411.

In the embodiment, the branch circuit board 442 and/or the branch circuit board 443 may be appropriately bent to suit a position of a sound inlet corresponding to the microphone 432 on the core housing 41. Specifically, the flexible circuit board 44 may be disposed in the core housing 41 in a manner that the main circuit board 441 is parallel to the bottom end wall 412. Therefore, the first microphone 432*a* may correspond to the bottom end wall 412 without bending the main circuit board 441. Since the second microphone 432*b* may be fixed on the peripheral side wall 411 of the core housing 41, it may be necessary to bend the second main circuit board 441. Specifically, the branch circuit board 443 may be bent at one end away from the main circuit board 441 so that a board surface of the branch circuit board 443 may be perpendicular to a board surface of the main circuit board 441 and the branch circuit board 442. Further, the second microphone 432*b* may be fixed at the peripheral side wall 411 of the core housing 41 in a direction facing away from the main circuit board 441 and the branch circuit board 442.

In one embodiment, the first pads 45, the second pads, the first microphone 432*a*, and the second microphone 432*b* may be disposed on the same side of the flexible circuit board 44. The second pads may be disposed adjacent to the second microphone 432*b*.

In some embodiments, the second pads may be specifically disposed at one end of the branch circuit board 443 away from the main circuit board 441 and have the same direction as the second microphone 432*b* and disposed at intervals. Therefore, the second pads may be perpendicular to the direction of the first pads 45 as the branch circuit board 443 is bent. It should be noted that the branch circuit board 443 may not be perpendicular to the board surface of the main circuit board 441 after being bent, which may be determined according to the arrangement between the peripheral side wall 411 and the bottom end wall 412.

Further, another side of the flexible circuit board 44 may be disposed with a rigid support plate 4*a* and a microphone rigid support plate 4*b* for supporting the first pads 45. The microphone rigid support plate 4*b* may include a rigid support plate 4*b*1 for supporting the first microphone 432*a* and a rigid support plate 4*b*2 for supporting the second pads and the second microphone 432*b* together.

In some embodiments, the rigid support plate 4*a*, the rigid support plate 4*b*1, and the rigid support plate 4*b*2 may be mainly used to support the corresponding pads and the microphone 432, and thus may need to have certain strengths. The materials of the three may be the same or different. The specific material may be polyimide film (PI film), or other materials that may provide the strengths, such as polycarbonate, polyvinyl chloride, etc. In addition, the thicknesses of the three rigid support plates may be set according to the strengths of the rigid support plates, and actual strengths required by the first pads 45, the second pads, the first microphone 432*a*, and the second microphone 432*b*, and be not specifically limited herein.

In some embodiments, the rigid support plate 4*a*, the rigid support plate 4*b*1, and the rigid support plate 4*b*2 may be three different regions of an entire rigid support plate, or three independent bodies spaced apart from each other, and be not specifically limited herein.

In one embodiment, the first microphone 432*a* and the second microphone 432*b* may correspond to two microphone components (not shown in the figure), respectively. In one embodiment, the structures of the two microphone components may be the same. A sound inlet 413 may be disposed on the core housing 41. Further, the bond conduction speaker device may be further disposed with an annular blocking wall 414 integrally formed on the inner surface of the core housing 41 at the core housing 41, and disposed at the periphery of the sound inlet 413, thereby defining an accommodation space (not shown in the figure) connected to the sound inlet 413.

In one embodiment, the flexible circuit board 44 may be disposed between a rigid support plate (e.g., the rigid support plate 4*a*, the rigid support plate 4*b*1, and the rigid support plate 4*b*2) and the microphone 432. A sound input 444 may be disposed at a position corresponding to a sound input 4*b*3 of the microphone rigid support plate 4*b*.

Further, the flexible circuit board 44 may further extend away from the microphone 432, so as to be connected to other functional components or wires to implement corresponding functions. Correspondingly, the microphone rigid support plate 4*b* may also extend out a distance with the flexible circuit board in a direction away from the microphone 432.

Correspondingly, the annular blocking wall 414 may be disposed with a gap matching the shape of the flexible circuit board 44 to allow the flexible circuit board 44 to extend out of the accommodation space. In addition, the gap may be further filled with a sealant to further improve the sealing.

Figure 17:
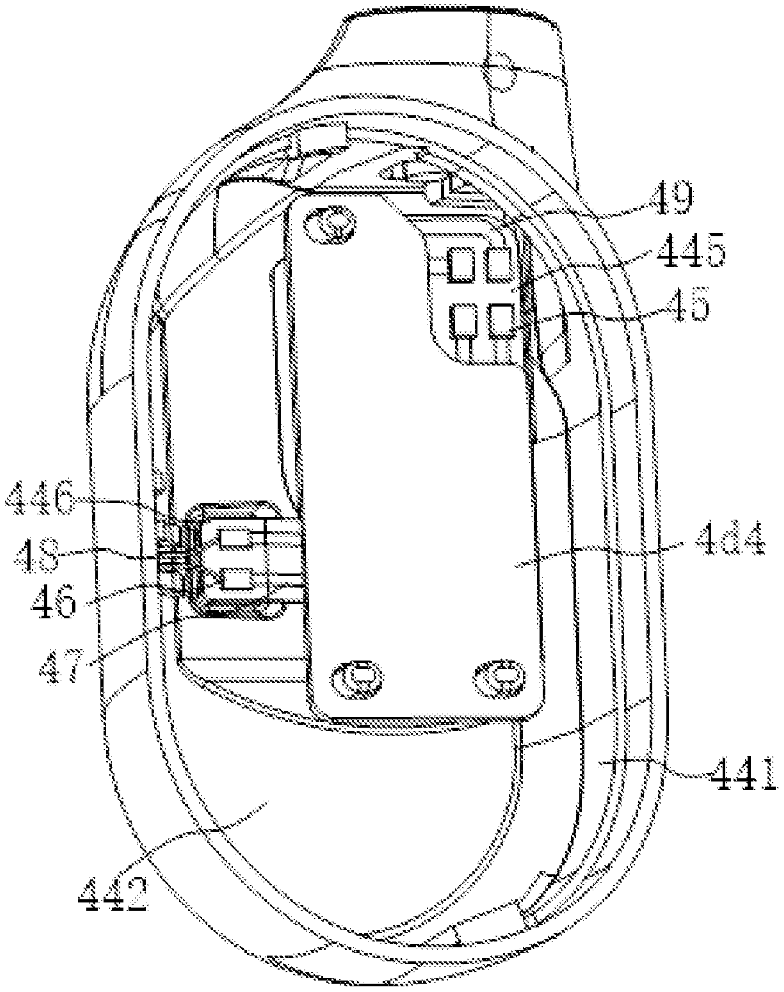
FIG. 17 is a schematic diagram illustrating a sectional view of a partial structure of an exemplary core housing according to some embodiments of the present disclosure.

FIG. 17 is a schematic diagram illustrating a sectional view of a partial structure of an exemplary core housing according to some embodiments of the present disclosure. In some embodiments, as shown in FIG. 17, the flexible circuit board 44 may include a main circuit board 445 and a branch circuit board 446. The branch circuit board 446 may extend along an extending direction perpendicular to the main circuit board 445. The plurality of first pads 45 may be disposed at the end of the main circuit board 445 away from the branch circuit board 446. A button switch may be mounted on the main circuit board 445. The second pads 46 may be disposed at the end of the branch circuit board 446 away from the main circuit board 445. The first auxiliary function module may be a button switch 431. The second auxiliary function module may be a microphone 432.

In the embodiment, a board surface of the flexible circuit board 44 and the bottom end wall 412 may be disposed in parallel and at intervals, so that the button switch may be disposed towards the bottom end wall 412 of the core housing 41.

As described above, an earphone core (also referred to as the earphone core 1402) may include a magnetic circuit component, a vibration component, an external wire, and a bracket. In some embodiments, the vibration component may include a coil and an internal lead. The external wire may transmit an audio current to the coil in the vibration component. One end of the external wire may be connected to the internal lead of the earphone core, and the other end may be connected to the flexible circuit board of a speaker. The bracket may have a wiring groove. At least a portion of the external wire and/or the internal lead may be disposed in the wiring groove. In some embodiments, the internal lead and the external wire may be welded to each other. A welding position may be located in the wiring groove.

Figure 18:
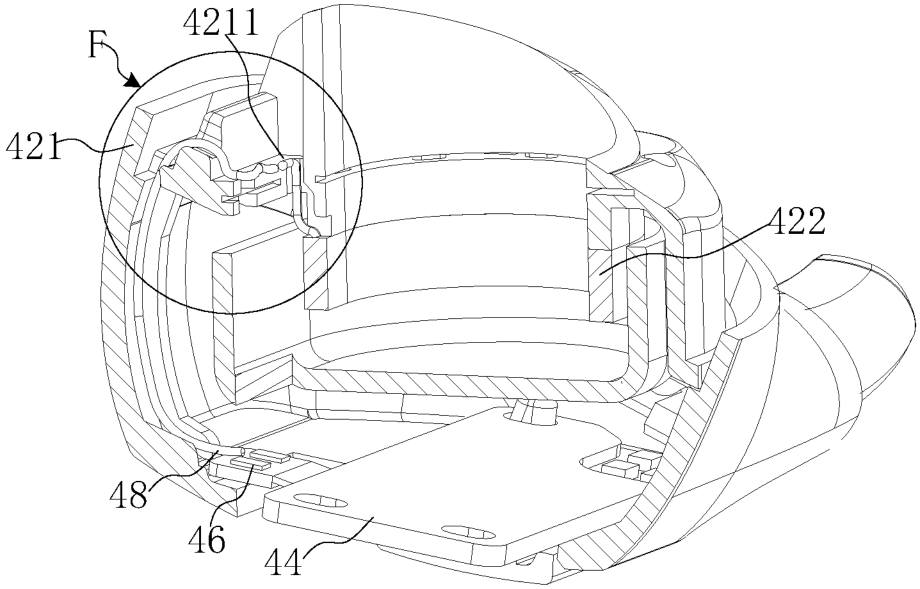
FIG. 18 is a schematic diagram illustrating a partial sectional view of an exemplary core housing according to some embodiments of the present disclosure.
Figure 19:
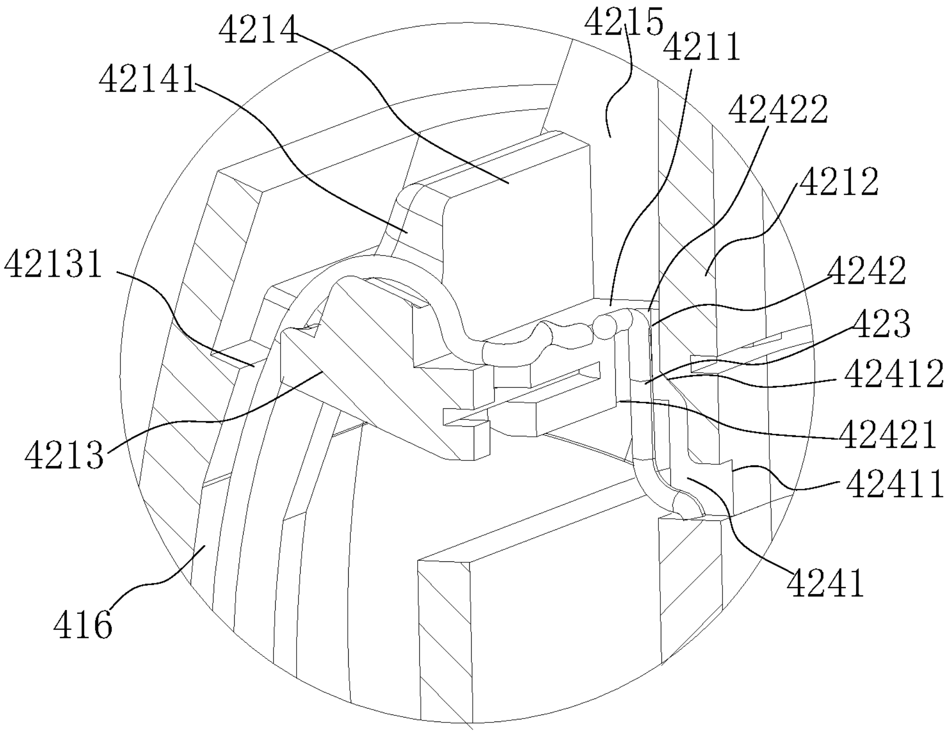
FIG. 19 is a schematic diagram illustrating a partially enlarged view of part F in FIG. 18 according to some embodiments of the present disclosure.

FIG. 18 is a schematic diagram illustrating a partial section view of an exemplary core housing according to some embodiments of the present disclosure. FIG. 19 is a schematic diagram illustrating a partially enlarged view of part F in FIG. 18. Specifically, referring to FIG. 18 and FIG. 19, an earphone core may include a bracket 421, a coil 422, and an external wire 48. The bracket 421 may be used to support and protect the entire structure of the earphone core. In the embodiment, the bracket 421 may be disposed with a wiring groove 4211 used to accommodate a circuit of the earphone core.

The coil 422 may be disposed on the bracket 421 and have at least one internal lead 423. One end of the internal lead(s) 423 may be connected to a main circuit in the coil 422 to lead out the main circuit and transmit an audio current to the coil 422 through the internal lead 423.

One end of the external wire 48 may be connected to the internal lead(s) 423. Further, the other end of the external wire 48 may be connected to a control circuit (not shown in the figure) to transmit the audio current through the control circuit to the coil 422 through the internal lead 423.

Specifically, during an assembly stage, the external wire 48 and the internal lead(s) 423 may need to be connected together by means of welding, or the like. Due to structural and other factors, after the welding is completed, a length of the wire may not be exactly the same as a length of a channel, and there may be an excess length part of the wire. And if the excess length part of the wire is not disposed reasonably, it may vibrate with the vibration of the coil 422, thereby making an abnormal sound and affecting the sound quality of the earphone core.

Further, at least one of the external wire 48 and the internal lead 423 may be wound and disposed in the wiring groove 4211. In an application scenario, the welding position between the internal lead 423 and the external wire 48 may be disposed in the wiring groove 4211, so that a portion of the external wire 48 and the internal lead 423 located near the welding position may be wound in the wiring groove 4211. In addition, in order to maintain stability, the wiring groove 4211 may be further filled with a sealant to further fix the wiring in the wiring groove 4211.

In the manner described above, the wiring groove 4211 may be disposed on the bracket 421, so that at least one of the external wire 48 and the internal lead 423 may be wound into the wiring groove 4211 to accommodate the excess length part of the wire, thereby reducing the vibration generated inside the channel, and reducing the influence of the abnormal sound caused by the vibration on the sound quality of the earphone core.

In one embodiment, the bracket 421 may include an annular main body 4212, a support flange 4213, and an outer blocking wall 4214. In some embodiments, the annular main body 4212, the support flange 4213, and the outer blocking wall 4214 may be integrally formed.

In some embodiments, the annular main body 4212 may be disposed inside the entire bracket 421 and used to support the coil 422. Specifically, a cross-section of the annular main body 4212 in a direction perpendicular to the radial direction of a ring of the annular main body 4212 may be consistent with the coil 422. The coil 422 may be disposed at an end of the annular main body 4212 facing the core housing. The inner side wall and the outer side wall of the annular main body 4212 may be flush with the inner side wall and the outer side wall of the coil 422, respectively, so that the inner side wall of the coil 422 and the inner side wall of the annular main body 4212 may be coplanar, and the outer side wall of the coil 422 and the outer side wall of the annular main body 4212 may be coplanar.

Further, the support flange 4213 may protrude on the outer side wall of the annular main body 4212 and extend along the outside of the annular main body 4212. Specifically, the support flange 4213 may extend outward in a direction perpendicular to the outer side wall of the annular main body 4212. As used herein, the support flange 4213 may be disposed at a position between two ends of the annular main body 4212. In the embodiment, the support flange 4213 may protrude around the outer side wall of the annular main body 4212 to form an annular support flange 4213. In other embodiments, the support flange 4213 may also be formed by protruding at a portion of the outer side wall of the annular main body 4212 according to needs.

The outer blocking wall 4214 may be connected to the support flange 4213 and spaced apart from the annular main body 4212 along the side of the annular main body 4212. As used herein, the outer blocking wall 4214 may be sleeved on the periphery of the annular main body 4212 and/or the coil 422 at intervals. Specifically, the outer blocking wall 4214 may be partially sleeved around the periphery of the annular main body 4212 and the coil 422 according to actual needs, or partially sleeved around the periphery of the annular main body 4212. It should be noted that, in the embodiment, a portion of the outer blocking wall 4214 close to the wiring groove 4211 may be sleeved on a portion of the periphery of the annular main body 4212. Specifically, the outer blocking wall 4214 may be disposed on a side of the support flange 4213 away from the core housing. In some embodiments, the outer side wall of the annular main body 4212, the side wall of the support flange 4213 away from the core housing, and the inner side wall of the outer blocking wall 4214 may together define the wiring groove 4211.

In one embodiment, a wiring channel 424 may be disposed on the annular main body 4212 and the support flange 4213. The internal lead(s) 423 may extend inside the wiring groove 4211 via the wiring channel 424.

In some embodiments, the wiring channel 424 may include a sub-wiring channel 4241 on the annular main body 4212 and a sub-wiring channel 4242 on the support flange 4213. The sub-wiring channel 4241 may be disposed through the inner side wall and the outer side wall of the annular main body 4212. A wiring port 42411 communicating with one end of the sub-wiring channel 4241 may be disposed on a side of the annular main body 4212 near the coil 422. A wiring port 42412 communicating with the other end of the sub-wiring channel 4241 may be disposed on a side of the core housing near the support flange 4213 facing the core housing. The sub-wiring channel 4242 may penetrate the support flange 4213 in a direction towards the outside of the core housing. The wiring port 42421 communicating with the end of the sub-wiring channel 4242 may be disposed on a side of the support flange 4213 facing the core housing. The wiring port 42422 communicating with the other end of the sub-wiring channel 4242 may be disposed on a side away from the core housing. In some embodiments, the wiring port 42412 and the wiring port 42421 may communicate through a space between the support flange 4213 and the annular main body 4212.

Further, the internal lead(s) 423 may enter the wiring port 42411, extend along the sub-wiring channel 4241, exit from the wiring port 42412 to enter a region between the annular main body 4212 and the support flange 4213, further enter the sub-wiring channel 4242 from the wiring port 42421, and extend into the wiring groove 4211 after passing through the wiring port 42422.

In one embodiment, the top of the outer blocking wall 4214 may be disposed with a slot 42141. The external wire 48 may extend inside the wiring groove 4211 through the slot 42141.

In some embodiments, one end of the external wire 48 may be disposed on the flexible circuit board 44. The flexible circuit board 44 may be specifically disposed on an inner side of the earphone core facing the core housing.

In the embodiment, the support flange 4213 may be further extended to a side of the outer blocking wall 4214 away from the annular main body 4212 to form an outer edge. Further, the outer edge may surround and abut on the inner side wall of the core housing. Specifically, the outer edge of the support flange 4213 may be disposed with a slot 42131, so that the external wire 48 on the inner side of the earphone core facing the core housing may be extended to the outer side of the support flange 4213 facing the core housing through the slot 42131, and then to the slot 42141, and enter the wiring groove 4211 through the slot 42141.

Further, the inner side wall of the core housing may be disposed with a guide groove 416. One end of the guide groove 416 may be located on one side of the flexible circuit board 44 and the other end may communicate with the slot 42131 and extend in a direction towards the outside of the core housing, so that the external wire 48 extends from the flexible circuit board to a second wiring groove by passing through the guide groove 416.

In one embodiment, the bracket 421 may further include two side blocking walls 4215 spaced along the circumferential direction of the annular main body 4212 and connected to the annular main body 4212, the support flange 4213, and the outer blocking wall 4214, thereby defining the wiring groove 4211 between the two side blocking walls 4215.

Specifically, the two side blocking walls 4215 may be oppositely disposed on the support flange 4213 and protrude towards the outer side of the core housing along the support flange 4213. In some embodiments, a side of the two side blocking walls 4215 facing the annular main body 4212 may be connected to the outer side wall of the annular main body 4212. A side away from the annular main body 4212 may terminate at the outer side wall of the outer blocking wall 4214. The wiring port 42422 and the slot 42141 may be defined between the two side blocking walls 4215. Therefore, the internal lead(s) 423 exiting from the wiring port 42422 and the external wire 48 entering through the slot 42141 may extend into the wiring groove 4211 defined by the two side blocking walls 4215.

It should be noted that the above descriptions of the speaker device are merely provided for the purposes of illustration, and not intended to limit the scope of the present disclosure. For persons having ordinary skills in the art, multiple variations and modifications on the specific manners of the speaker device may be made under the teachings of the present disclosure. However, those variations and modifications do not depart from the scope of the present disclosure. For example, the branch circuit board may further include third pads and a third flexible circuit board. Such variations and modifications do not depart from the scope of the present disclosure.

Figure 20:
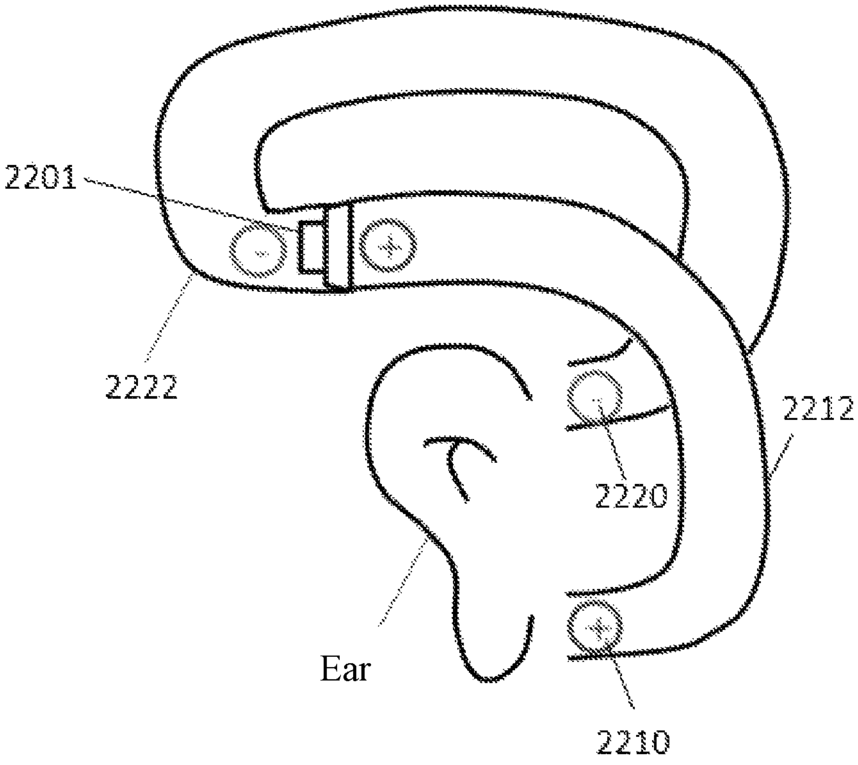
FIG. 20 is a schematic diagram illustrating sound transmission through air conduction according to some embodiments of the present disclosure.

In some embodiments, the speaker device described above may transmit the sound to the user through air conduction. When the air condition is used to transmit the sound, the speaker device may include one or more sound sources. The sound source may be located at a specific position of the user's head, for example, the top of the head, the forehead, the cheek, a temple, an auricle, the back of an auricle, etc., without blocking or covering an ear canal. FIG. 20 is a schematic diagram illustrating sound transmission through air conduction according to some embodiments of the present disclosure.

As shown in FIG. 20, a sound source 2210 and a sound source 2220 may generate sound waves with opposite phases ("+" and "−" in the figure may indicate the opposite phases). For brevity, the sound sources used herein may refer to sound outlets of a speaker device that outputs sounds. For example, the sound source 2210 and the sound source 2220 may be two sound outlets respectively located at a specific position (e.g., the core housing 20 or the circuit housing 30) of the speaker device.

In some embodiments, the sound source 2210 and the sound source 2220 may be generated by a same vibration device 2201. The vibration device 2201 may include a diaphragm (not shown in FIG. 20). When the diaphragm is driven to vibrate by an electric signal, a front side of the diaphragm may drive air to vibrate. The sound source 2210 may be formed at a sound output hole through a sound guiding channel 2212. A back side of the diaphragm may drive air to vibrate, and the sound source 2220 may be formed at the sound output hole through a sound guiding channel 2222. The sound guiding channel refers to a sound transmission route from the diaphragm to the corresponding outlet. In some embodiments, the sound guiding channel may be a route surrounded by a specific structure (e.g., the core housing 20 or the circuit housing 30) on the speaker device. It should be noted that in some alternative embodiments, the sound source 2210 and the sound source 2220 may be generated by different vibrating diaphragms of different vibration devices, respectively.

Among the sounds generated by the sound source 2210 and the sound source 2220, one portion of the sounds may be transmitted to the ear of a user to form a sound heard by the user. Another portion of the sound may be transmitted to the environment to form a leaked sound. Considering that the sound source 2210 and the sound source 2220 are relatively close to the ears of the user, for convenience of description, the sound transmitted to the ear of the user may be referred to as a near-field sound. The leaked sound transmitted to the environment may be referred to as a far-field sound. In some embodiments, the near-field/far-field sounds with different frequencies generated by the speaker device may be related to a distance between the sound source 2210 and the sound source 2220. Generally, the near-field sound generated by the speaker device may increase along with an increment of the distance between the two sound sources, and the far field sound (i.e., the leaked sound) may increase along with an increment of a frequency.

For sounds with different frequencies, the distance between the sound source 2210 and the sound source 2220 may be designed, respectively, so that a low-frequency near-field sound (e.g., a sound with a frequency less than 800 Hz) generated by the speaker device may be relatively great, and a far-field sound with the relatively high frequency (e.g., a sound with a frequency greater than 2000 Hz) may be relatively small. In order to implement the above purpose, the speaker device may include two or more sets of dual sound sources. Each set of the dual sound sources may include two sound sources similar to the sound source 2210 and the sound source 2220, and generate sounds with a specific frequency, respectively. Specifically, a first set of the dual sound sources may be used to generate a sound with a relatively low frequency. A second set of the dual sound sources may be used to generate a sound with a relatively great frequency. To increase a volume of the near-field sound with the relatively low frequency, the distance between two sound sources in the first set of the dual sound sources may be set with a relatively large value. Since the low-frequency near-field sound may have a relatively long wavelength, the relatively great distance between the two sound sources may not cause a relatively great phase difference in the far-field, and thereby reducing sound leakage in the far-field. In some embodiments, to reduce the far-field sound with the relatively high frequency, the distance between the two sound sources in the second set of the dual sound sources may be set with a relatively small value. Since the far field sound with the relatively high frequency may have a relatively short wavelength, the relatively small distance between the two sound sources may avoid the generation of a relatively large phase difference in the far-field, thereby reducing the sound leakage. The distance between the two sound sources of the second set of the dual sound sources may be less than the distance between the two sound sources of the first set of the dual sound sources.

The beneficial effects of the embodiments of the present disclosure may include but are not limited to the following. (1) The protective sleeve at the ear hook elastically abuts with the core housing improves the waterproof performance of the speaker device; (2) the ear hook and the core housing of the speaker device are molded using different molds, thereby reducing the processing difficulty of the mold and the molding difficulty in the production of the ear hook and the housing; (3) the core housing and the ear hook of the speaker device may be connected through a hinge component, and the fitting position of the core housing of the earphone core and the human skin may be adjusted; (4) at least one of the external wire and the internal lead may be wound into the wiring groove to accommodate the excess length part of the wire, which may reduce the vibration generated inside the channel, and reduce the influence of the abnormal sound caused by the vibration on the sound quality of the earphone core, thereby improving the sound quality of the speaker device. It should be noted that different embodiments may have different beneficial effects. In different embodiments, the possible beneficial effects may be any one or a combination of the beneficial effects described above, or any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

What is claimed is:

1. A speaker device, comprising: an ear hook including a wire, a first plug end, and a second plug end, the ear hook being surrounded by a protective sleeve, and the protective sleeve being formed, by injection molding, on periphery of the wire, the first plug end, and the second plug end; wherein the first plug end and the second plug end are arranged with a first wiring channel and a second wiring channel respectively, the first wiring channel includes a first wiring groove and a first wiring hole connecting the first wiring groove and an outer end surface of the first plug end, and the second wiring channel includes a second wiring groove and a second wiring hole connecting the second wiring groove and the outer end surface of the second plug end; a core housing for accommodating an earphone core, the core housing being fixed to the first plug end and elastically abutted against the protective sleeve; and a circuit housing for accommodating a control circuit or a battery, the circuit housing being fixed to the second plug end, and the control circuit or the battery driving the earphone core to vibrate to generate a sound.

2. The speaker device of claim 1, wherein the ear hook further includes an elastic metal wire, and the protective sleeve being formed on periphery of the wire, the elastic metal wire, the first plug end, and the second plug end.

3. The speaker device of claim 2, wherein the first plug end and the second plug end are formed, by injection molding, at both ends of the elastic metal wire respectively.

4. The speaker device of claim 1, wherein the wire extends along the first wiring channel and the second wiring channel.

5. The speaker device of claim 1, wherein the wire extends along the first wiring groove and the first wiring hole and is exposed on the outer end surface of the first plug end, and the wire extends along the second wiring groove and the second wiring hole and is exposed on the outer end surface of the second plug end.

6. The speaker device of claim 1, wherein the core housing is arranged with a first socket connecting with an outer end surface of the core housing, a stopping block is arranged on an inner sidewall of the first socket, and the first socket is connected to the first plug end.

7. The speaker device of claim 6, wherein the first plug end includes:

an inserting portion being at least partially inserted into the first socket and abutting against an outer side surface of the stopping block; and two elastic hooks being arranged on a side of the inserting portion facing inside of the core housing.

8. The speaker device of claim 7, wherein an exposed part of the inserting portion is arranged in a stepped manner to form an annular table surface spaced apart from the outer end surface of the core housing.

9. The speaker device of claim 1, wherein the speaker device further includes a fastener, the circuit housing is arranged with a second socket, and the second plug end is at least partially inserted into the second socket and connected to the second socket by the fastener.

10. The speaker device of claim 1, wherein the ear hook further includes a housing sheath integrally formed with the protective sleeve, the housing sheath being wrapped around periphery of the circuit housing.

11. The speaker device of claim 1, further comprising:

an auxiliary function module configured to receive an auxiliary signal and perform an auxiliary function; and a flexible circuit board configured to electrically connect to an audio signal wire and an auxiliary signal wire of the control circuit, and electrically connect the audio signal wire and the auxiliary signal wire to the earphone core and the auxiliary function module respectively; wherein the auxiliary function module and the flexible circuit board are accommodated in the core housing.

12. The speaker device of claim 11, wherein the flexible circuit board includes a main circuit board and a first branch circuit board, wherein the first branch circuit board is connected to the main circuit board and extends away from the main circuit board along one end of the main circuit board.

13. The speaker device of claim 12, wherein the auxiliary function module at least includes a first auxiliary function module, and the first auxiliary function module is disposed on the main circuit board.

14. The speaker device of claim 13, wherein the auxiliary function module further includes a second auxiliary function module, and the second auxiliary function module is disposed on the first branch circuit board.

15. The speaker device of claim 14, wherein the flexible circuit board at least comprises a plurality of first pads and a plurality of second pads, at least one first pad of the plurality of first pads is electrically connected to the audio signal wire, the at least one first pad is electrically connected to at least one second pad of the plurality of second pads via a first flexible lead on the flexible circuit board, and the at least one second pad is electrically connected to the earphone core through an external wire.

16. The speaker device of claim 15, wherein the plurality of first pads are disposed on the main circuit board, and the at least one second pad is disposed on the first branch circuit board.

17. The speaker device of claim 15, wherein the flexible circuit board further includes a second branch circuit board spaced from the first branch circuit board, wherein the second branch circuit board is connected to the main circuit board and extends away from the main circuit board along the other end of the main circuit board.

18. The speaker device of claim 17, wherein the auxiliary function module further includes a third auxiliary function module, and the third auxiliary function module is disposed on the second branch circuit board.

19. The speaker device of claim 1, wherein the earphone core includes:

a magnetic circuit assembly configured to provide a magnetic field; and a vibration assembly including a coil and an internal lead, wherein the coil is located in the magnetic field, the internal lead is electrically connected to the coil, the coil receives an audio current through the internal lead and converts the audio current into a mechanical vibration signal in the magnetic field, and one end of an external wire is electrically connected to a second pad, and the other end of the external wire is electrically connected to the internal lead to transmit the audio current to the coil.

20. The speaker device of claim 19, wherein the core housing includes a wiring groove, and at least one of the external wire and the internal lead is partially disposed in the wiring groove.

* * * * *